US012774204B2

(12) United States Patent
Fan et al.

(10) Patent No.: US 12,774,204 B2
(45) Date of Patent: Oct. 27, 2026

(54) BOTTLE CAP OPENING AND CLOSING DEVICE AND EXPERIMENTAL APPARATUS

(71) Applicant: SHENZHEN JINGTAI TECHNOLOGY CO., LTD., Shenzhen (CN)

(72) Inventors: Kaiping Fan, Nanping City (CN); Yang Liu, Shenzhen (CN)

(73) Assignee: SHENZHEN JINGTAI TECHNOLOGY CO., LTD., Shenzhen (CN)

( * ) Notice: Subject to any disclaimer, the term of this patent is extended or adjusted under 35 U.S.C. 154(b) by 342 days.

(21) Appl. No.: 18/574,289

(22) PCT Filed: Dec. 23, 2022

(86) PCT No.: PCT/CN2022/141370

§ 371 (c)(1),
(2) Date: Dec. 26, 2023

(87) PCT Pub. No.: WO2023/125277

PCT Pub. Date: Jul. 6, 2023

(65) Prior Publication Data

US 2024/0383737 A1 Nov. 21, 2024

(30) Foreign Application Priority Data

Dec. 31, 2021 (CN) ......................... 202111680014.9

(51) Int. Cl.
*B67B 3/20* (2006.01)
*B67B 7/18* (2006.01)

(52) U.S. Cl.
CPC ............ *B67B 3/2053* (2013.01); *B67B 3/208* (2013.01); *B67B 7/182* (2013.01)

(58) Field of Classification Search
CPC ....... B67B 7/182; B67B 3/208; B67B 3/2053; B67B 3/28
See application file for complete search history.

(56) References Cited

U.S. PATENT DOCUMENTS 4,171,650 A 10/1979 Cardinal
5,345,844 A * 9/1994 Marsaw ................. B67B 7/182 81/3.2

(Continued)

FOREIGN PATENT DOCUMENTS

CN 107487750 A 12/2017
CN 208054867 U 11/2018

(Continued)

*Primary Examiner* — David B. Thomas
(74) *Attorney, Agent, or Firm* — Muncy, Geissler, Olds & Lowe, P.C.

(57) ABSTRACT

A bottle cap opening and closing device and an experimental apparatus. The bottle cap opening and closing device includes a base, a bottle body clamping mechanism used for clamping a bottle body, a first buffer mechanism arranged between the bottle body clamping mechanism and the base, a bottle cap clamping mechanism arranged opposite the bottle body clamping mechanism and is used for clamping a bottle cap, and a rotation driving mechanism drive-connected to the bottle body clamping mechanism and drives the bottle body clamping mechanism to rotate relative to the bottle cap clamping mechanism to enable the bottle body and the bottle cap to be relatively tightened or separated from each other.

27 Claims, 7 Drawing Sheets

(56) References Cited

U.S. PATENT DOCUMENTS

| | | | | |
|---|---|---|---|---|
| 5,353,665 | A | 10/1994 | Heebner | |
| 5,996,441 | A | 12/1999 | Bateman | |
| 6,089,124 | A | 7/2000 | Murphy | |
| 6,651,531 | B1 | 11/2003 | Thornton | |
| 9,199,755 | B1 * | 12/2015 | Cohen | B67B 7/02 |
| 11,332,354 | B2 * | 5/2022 | Christensen | G01N 35/04 |
| 2003/0070510 | A1 * | 4/2003 | Tremblav | B67B 7/182 81/3.2 |
| 2005/0132845 | A1 | 6/2005 | Chervak et al. | |
| 2007/0006550 | A1 * | 1/2007 | Kemper | B67B 3/00 53/317 |
| 2011/0131933 | A1 * | 6/2011 | Livingston | B67B 3/20 53/111 R |
| 2012/0272624 | A1 * | 11/2012 | Argeriou | B67B 7/182 53/490 |
| 2015/0175289 | A1 * | 6/2015 | Zumbach | B65B 7/2835 53/492 |
| 2015/0175398 | A1 * | 6/2015 | Christensen | B67B 7/182 53/318 |
| 2019/0375619 | A1 * | 12/2019 | Hovendahl | G01N 35/0099 |

FOREIGN PATENT DOCUMENTS

| | | | |
|---|---|---|---|
| CN | 210163092 | U | 3/2020 |
| CN | 111392673 | A | 7/2020 |
| CN | 112978652 | A | 6/2021 |
| CN | 213364578 | U | 6/2021 |
| CN | 113086914 | A | 7/2021 |
| CN | 113800450 | A | 12/2021 |
| CN | 215048547 | U | 12/2021 |
| CN | 215208365 | U | 12/2021 |
| CN | 215249467 | U | 12/2021 |
| DE | 2610209 | A1 | 9/1977 |
| GB | 1361072 | A | 7/1974 |
| WO | 2021233274 | A1 | 11/2021 |

* cited by examiner

BOTTLE CAP OPENING AND CLOSING DEVICE AND EXPERIMENTAL APPARATUS

CROSS-REFERENCE TO RELATED APPLICATIONS

The present application claims priority to Chinese Patent Application No. 202111680014.9 filed with the China National Intellectual Property Administration on Dec. 31, 2021, entitled bottle cap opening and closing device and experimental apparatus, the contents of which are all incorporated herein by reference in their entireties.

FIELD OF THE INVENTION

The present application relates to the technical field of mechanical apparatus, in particular to a bottle cap opening and closing device and an experimental apparatus.

DESCRIPTION OF THE RELATED ART

Container bottle include bodies and caps and are used to hold liquids. To ensure the sealing of the container bottle, the bottle cap is usually connected to the bottle body through threaded connection. At present, it is usually necessary to use a bottle cap opening and closing device to open the container bottle. The bottle cap opening and closing device usually includes a bottle body clamping mechanism and a bottle cap clamping mechanism. When opening a container bottle, the bottle body is fixed by the bottle body clamping mechanism, and the bottle cap is clamped and rotated by the bottle cap clamping mechanism. However, when the bottle cap and the bottle body are excessively tightened, there may be situations where the bottle cap opening and closing device cannot open the container bottle.

SUMMARY

In a first aspect, the present disclosure provides a bottle cap opening and closing device which includes a base, a bottle body clamping mechanism which is rotatably arranged on the base and is used for clamping a bottle body, a first buffer mechanism which is arranged between the bottle body clamping mechanism and the base, a bottle cap clamping mechanism which is arranged opposite the bottle body clamping mechanism and is used for clamping a bottle cap, and a rotation driving mechanism which is in driving connection with the bottle body clamping mechanism and drives the bottle body clamping mechanism to rotate relative to the bottle cap clamping mechanism so as to enable the bottle body and the bottle cap to be relatively tightened or separated from each other.

In a second aspect, the present disclosure provides an experimental apparatus which includes an experimental platform and a bottle cap opening and closing device described above, wherein the bottle cap opening and closing device is arranged on the experimental platform.

According to the bottle cap opening and closing device provided in an embodiment of the present disclosure, the bottle body is clamped by the bottle body clamping mechanism, the bottle cap is clamped by the bottle cap clamping mechanism, and the bottle body clamping mechanism is driven to rotate by the rotation driving mechanism. The bottle body clamping mechanism rotates to drive the bottle body to rotate relative to the bottle cap. Moreover, under the action of the first buffer mechanism, the excessive tightening of the bottle body and the bottle cap and the damage caused by it can be avoided. According to the present disclosure, during the process of opening or tightening the bottle cap, the bottle body clamping mechanism applies a rotational force to the bottle body. Compared with the traditional technical solution where a bottle cap clamping mechanism applies a rotational force to the bottle cap, the torque is greater, making it easier to open or tighten the bottle cap.

It should be understood that the foregoing general description and the following detailed description are illustrative and explanatory only and do not limit the present disclosure.

BRIEF DESCRIPTION OF THE DRAWINGS

By providing a more detailed description of the exemplary embodiments of the present disclosure in combination with the accompanying drawings, the above and other purposes, features, and advantages of the present disclosure will become more apparent. In the exemplary embodiments of the present disclosure, the same reference numerals usually represent the same component.

Figure 1:
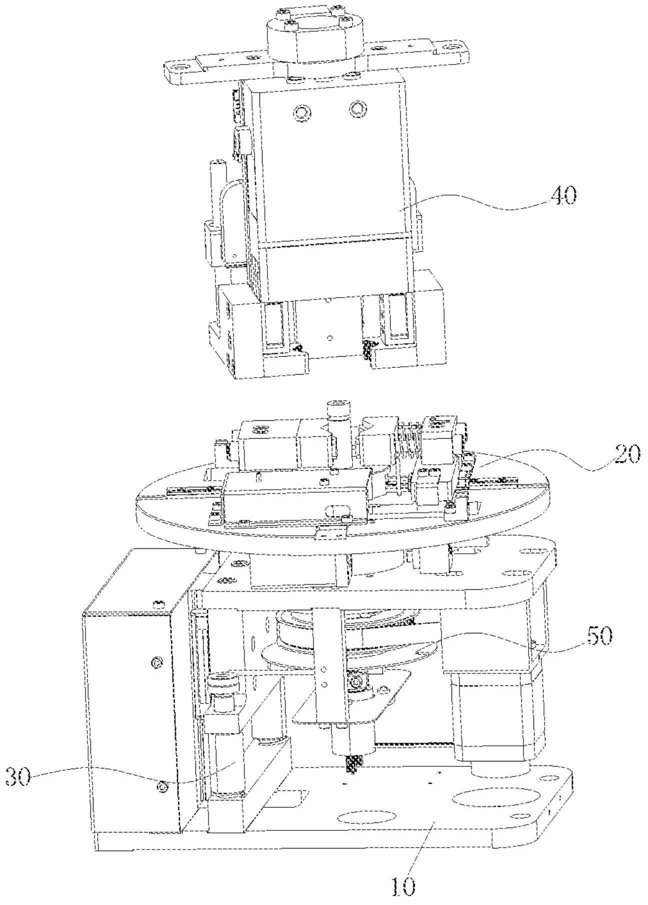
FIG. 1 shows the bottle cap opening and closing device according to an embodiment of the present disclosure.

In above figures, following reference numerals are included.

10: base;

20: bottle body clamping mechanism;

21: support seat; 211: support platform; 212: second sliding slot;

22: first clamping assembly; 221: first connecting part; 222: first bottle body clamping part;

23: second clamping assembly; 231: second bottle body clamping part; 232: second connecting part; 233: connecting screw;
24: first buffer component; 241: first elastic member; 242: first guide rod;
25: first driving assembly;
26: second driving assembly; 261: second driving member; 2611: second motor protection cover; 262: second screw rod; 263: second screw nut pair;
271: first guide rail; 272: first guide block; 273: second guide block;
291: second reset sensor; 292: second stopper;
30: first buffer mechanism;
31: second lifting plate; 311: support plate; 312: sliding plate; 32: third buffer component; 321: third spring; 322: fourth guide rod;
33: guide part;
40: bottle cap clamping mechanism;
41: body; 411: guide slot;
42: third driving member;
43: first bottle cap clamping part; 431: second anti-slip structure;
44: clamping rod; 441: third anti-slip structure; 442: third elastic structure; 443: clamping groove; 444: cut surface for wrench;
45: main body part;
46: third connecting part;
471: fourth driving member; 472: first lifting plate; 4721: first limit part; 473: third screw rod;
474: third screw nut pair; 475: second limit part; 476: third guide rod; 477: connecting block;
481: limit sensor; 482: limit baffle;
491: quick-change connecting plate; 492: pneumatic quick-change connector;
50: rotation driving mechanism;
51: rotation driving member; 52: first synchronous wheel; 53: synchronous belt; 54: sliding ring;
60: moving mechanism.

DETAILED DESCRIPTION OF THE EMBODIMENTS

Some embodiments of the present disclosure will be described in more detail below with reference to the accompanying drawings. Although some embodiments of the present disclosure are shown in the accompanying drawings, it should be understood that the present disclosure can be implemented in various forms and should not be limited by the embodiments described here. On the contrary, these embodiments are provided to make the present disclosure more thorough and complete, and to fully convey the scope of the present disclosure to ones skilled in the art.

The terms used in the present disclosure are for the purpose of describing specific embodiments only and are not intended to be limit of the present disclosure. The singular forms of "a", "said", and "the" used in the present disclosure and the accompanying claims are intended to include the plural forms as well, unless the context clearly indicates other meanings. It should also be understood that the term "and/or" used herein includes any or all possible combinations of one or more related listed items.

It should be understood that although the terms "first," "second," "third," etc. may be used herein to describe various information, the information should not be limited to these terms. These terms are only used to distinguish the same type of information from each other. For example, without departing from the scope of the present disclosure, first information can also be referred to as second information, and similarly, second information may also be referred to as first information. Therefore, a feature defines as "first" or "second" can explicitly or implicitly include one or more of that feature. In the description of the present disclosure, "a plurality of" means two or more, unless otherwise specified.

According to a bottle cap opening and closing device and an experimental apparatus provided in some embodiments of the present disclosure, the problem of being unable to open container bottles can be solved.

Technical solutions according to some embodiments of the present disclosure will be described in detailed in combination with the accompanying drawings.

Figure 2:
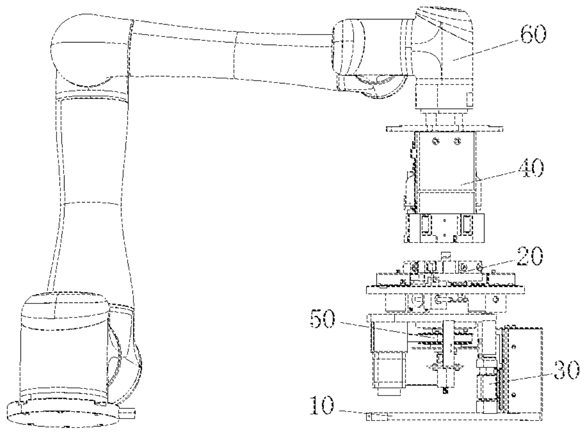
FIG. 2 is a main view of the bottle cap opening and closing device according to an embodiment of the present disclosure.

As shown in FIGS. 1 and 2, an embodiment of the present application provides a bottle cap opening and closing device which includes a base 10, a bottle body clamping mechanism 20, a first buffer mechanism 30, a bottle cap clamping mechanism 40, and a rotation driving mechanism 50. Specifically, the bottle body clamping mechanism 20 is rotatably arranged on the base 10, and the bottle body clamping mechanism 20 is used for clamping a bottle body. The first buffer mechanism 30 is arranged between the bottle body clamping mechanism 20 and the base 10. The bottle cap clamping mechanism 40 is arranged opposite the bottle body clamping mechanism 20, and the bottle cap clamping mechanism 40 is used for clamping the bottle cap. The rotation driving mechanism 50 is in driving connection with the bottle body clamping mechanism 20, and the rotation driving mechanism 50 drives the bottle body clamping mechanism 20 to rotate relative to the bottle cap clamping mechanism 40 so as to enable the bottle body and the bottle cap to be relatively tightened or separated from each other.

According to the technical solution provided by an embodiment of the present disclosure, the bottle body is clamped by the bottle body clamping mechanism 20, the bottle cap is clamped by the bottle cap clamping mechanism 40, and the bottle body clamping mechanism 20 is driven to rotate by the rotation driving mechanism 50. The bottle body clamping mechanism 20 rotates to drive the bottle body to rotate relative to the bottle cap. Moreover, under the action of the first buffer mechanism 30, the excessive tightening of the bottle body and the bottle cap and the damage caused by it can be avoided. According to an embodiment of the present disclosure, during the process of opening or tightening the bottle cap, the bottle body clamping mechanism 20 applies a rotational force to the bottle body. Compared with the traditional technical solution where a bottle cap clamping mechanism applies a rotational force to the bottle cap, the torque is greater, making it easier to open or tighten the bottle cap.

Figure 3:
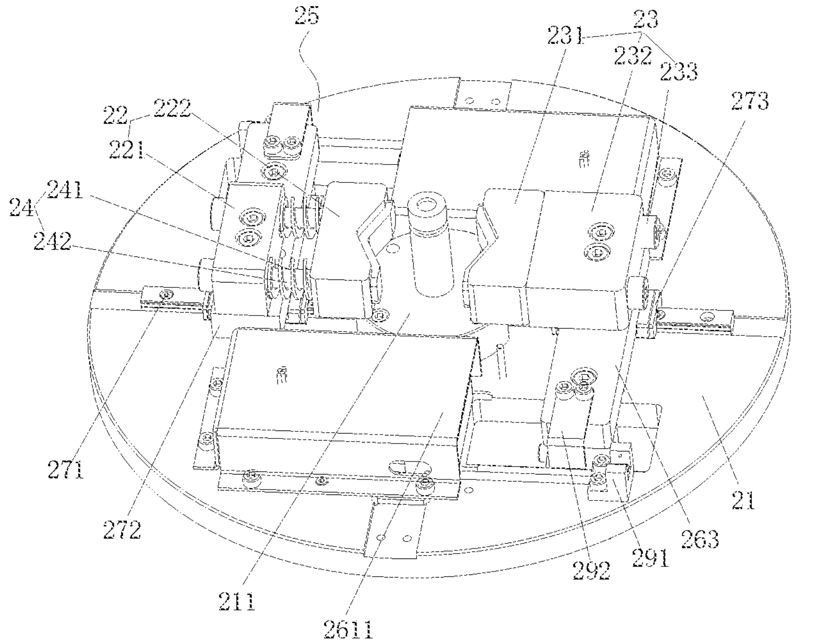
FIG. 3 shows the bottle body clamping mechanism according to an embodiment of the present disclosure, viewing from one perspective.
Figure 4:
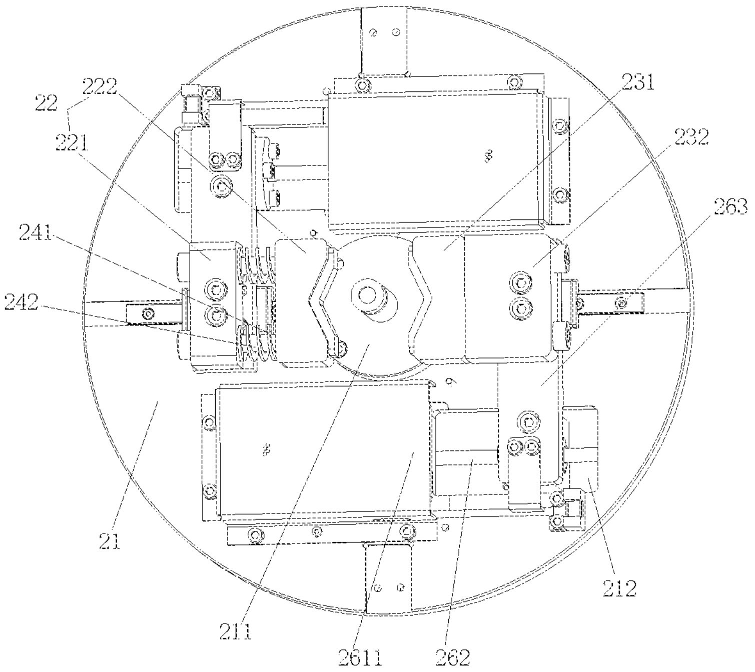
FIG. 4 is a top view of the bottle body clamping mechanism according to an embodiment of the present disclosure.
Figure 5:
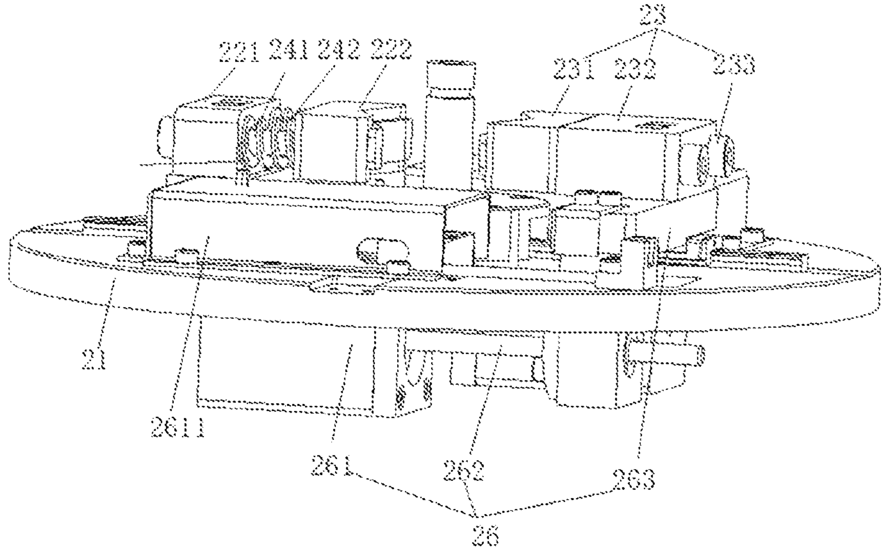
FIG. 5 shows the bottle body clamping mechanism according to an embodiment of the present disclosure, viewing from another perspective.

As shown in FIGS. 3 to 5, the bottle body clamping mechanism 20 includes a support seat 21, a drive mechanism, a first clamping assembly 22, a second clamping assembly 23 and a second buffer mechanism. Specifically, the drive mechanism is arranged opposite each other on the support seat 21. The first clamping assembly 22 and the second clamping assembly 23 are arranged on the support seat 21, and the driving mechanism is in driving connection with the first clamping assembly 22 and/or the second clamping assembly 23. The driving mechanism drives the first clamping assembly 22 and/or the second clamping assembly 23 to move, and the first clamping assembly 22 and the second clamping assembly 23 are in cooperation with each other to clamp the bottle body. The first clamping assembly 22 and/or the second clamping assembly 23 are provided with the second buffer mechanism.

Specifically, the bottle body is placed between the first clamping assembly 22 and the second clamping assembly 23, and the clamping of the bottle body is achieved through the cooperation of the first clamping assembly 22 and the second clamping assembly 23. Because at least one of the first clamping assembly 22 and the second clamping assembly 23 is provided with a second buffer mechanism, when clamping the bottle body, the clamping assembly provided with the second buffer mechanism can pre-press the bottle body, and overpressure on the bottle body can be avoided, which can reduce the clamping force of the clamping assembly on the bottle body, and thereby reducing the damage to the bottle body due to excessive clamping force. Besides, the drive mechanism is in driving connection with at least one of the first clamping assembly 22 and the second clamping assembly 23, which can achieve automatically clamping the bottle body and improve the convenience of clamping the bottle body.

In this embodiment, the second buffer mechanism includes a first buffer component 24. The first clamping assembly 22 includes a first connecting part 221 and a first bottle body clamping part 222. Specifically, the first connecting part 221 is arranged on the support seat 21. The first bottle body clamping part 222 is arranged at one side of the first connecting part 221 near the second clamping assembly 23. The first buffer component 24 is arranged between the first connecting part 221 and the first bottle body clamping part 222, and the first bottle body clamping part 222 is movable relative to the first connecting part 221 through the first buffer component 24. When clamping the bottle body, after the first bottle body clamping part 222 presses against the bottle body, the bottle body exerts a certain force on the first bottle body clamping part 222. Under the action of the buffer component, the first bottle body clamping part 222 has a tendency to move away from the bottle body and moves away from the bottle body so as to avoid excessive pressure on the bottle body, avoiding or reducing the possibility of crushing the bottle body.

In an implementation, the first buffer component 24 includes a first elastic member 241. One end of the first elastic member 241 is connected to the first connecting part 221, and the other end of the first elastic member is connected to the first bottle body clamping part 222. When clamping the bottle body, after the first bottle body clamping part 222 presses against the bottle body, the bottle body exerts a certain force on the first bottle body clamping part 222. Under the action of the first bottle body clamping part 222, the first elastic member 241 is compressed to achieve a buffering effect, reducing the clamping force of the first bottle body clamping part 222 on the bottle body.

In an implementation, the first bottle body clamping part 222 is a block structure, and the first connecting part 221 is a block structure. The length direction of the first bottle body clamping part 222 is perpendicular to the direction from the first clamping assembly 22 to the second clamping assembly 23. The length direction of the first connecting part 221 is the same as the length direction of the first bottle body clamping part 222, and the first connecting part 221 is arranged right opposite to the first bottle body clamping part 222. One end of the first elastic member 241 is connected to a side wall of the first connecting part 221 at the side near the first bottle body clamping part 222, and the other end of the first elastic member 241 is connected to a side wall of the first bottle body clamping part 222 at the side near the first connecting part 221.

In this embodiment, two first elastic members 241 are provided. The two first elastic members 241 are spaced along the length direction of the first bottle body clamping part 222. By this configuration, the buffering effect of the first elastic members 241 on the first bottle body clamping part 222 can be further ensured, the uniformity of the force exerted by the first bottle body clamping part 222 on the bottle body can be ensured, and the possibility of crushing the bottle body can be reduced.

In an implementation, one first elastic member 241 is provided. One end of the first elastic member is connected to the middle of a side wall of the first bottle body clamping part 222 at the side near the first connecting part 221, and the other end of the first elastic member 221 is connected to the middle of a side wall of the first connecting part 221 at the side near the first bottle body clamping part 222. By this configuration, the uniformity of the force exerted by the first elastic member 241 on the first bottle body clamping part 222 and the uniformity of the force exerted by the first elastic member 241 on the first connecting part 221 can be ensured, further improving the stability of the first bottle body clamping part 222 in clamping the bottle body.

In an implementation, at least three first elastic members 241 are provided. Multiple first elastic members 241 are spaced along the length direction of the first bottle body clamping part 222. By this configuration, the buffering effect of the first elastic members 241 can be further enhanced, ensuring the steady movement of the first bottle body clamping part 222 relative to the first connecting part 221.

In this embodiment, the first elastic member 241 is the first spring, and the expansion and contraction direction of the first spring is the same as the direction from the first connecting part 221 to the first bottle body clamping part 222. One end of the first spring is connected to the first connecting part 221, and the other end of the first spring is connected to the first bottle body clamping part 222. The first spring has a simple structure, good buffering effect, large telescopic amount and convenient installation.

In an implementation, the first elastic member 241 is the first elastic sheet. One end of the first elastic sheet is connected to the first connecting part 221, and the other end of the first elastic sheet is connected to the first bottle body clamping part 222. The first elastic sheet has a simple structure and convenient installation.

In an implementation method, the first elastic member 241 is a first rubber block. One end of the first rubber block is connected to the first connecting part 221, and the other end of the first rubber block is connected to the first bottle body clamping part 222. The first rubber block has a simple structure.

In this embodiment, the first buffer component 24 further includes first guide rods 242. The first guide rod 242 is arranged between the first connecting part 221 and the first bottle body clamping part 222. The first guide rod 242 is used to guide the movement of the first bottle body clamping part 222 relative to the first connecting part 221. In this embodiment, the number of first guide rods 242 is the same as the number of the first springs. The first guide rods 242 are correspondingly arranged with the first springs, and the extension direction of the first guide rod 242 is the same as the direction from the first connecting part 221 to the first bottle body clamping part 222. The first spring is wound on the first guide rod 242. This configuration allows the first guide rods 242 to guide the expansion and contraction of the first springs, ensuring smoothness and stability of the first springs during the expansion and contraction process, thereby improving the smoothness of the movement of the first bottle body clamping part 222 relative to the first connecting part 221, and maximizing the uniformity of the force exerted by the first bottle body clamping part 222 on the bottle body, and ensuring stability during the clamping process.

In this embodiment, first guide holes are formed in the first connecting part 221. The number of the first guide holes is the same as the number of the first guide rods 242. The first guide holes are correspondingly arranged with the first guide rods 242, The axis direction of the first guide hole is the same as the extension direction of the first guide rod 242. One end of the first guide rod 242 is fixedly connected to the first bottle body clamping part 222, The other end of the first guide rod 242 is inserted into the first guide hole and is movable in the first guide hole. The first guide rod 242 is in match with the first guide hole to guide the movement of the first bottle body clamping part 222 relative to the first connecting part 221. Specifically, the end of the first bottle body clamping part 222 near the first connecting part 221 is provided with the first threaded holes. The number of the first threaded holes is the same as the number of the first guide holes. The first threaded hole is opposite to the first guide hole. The first guide rod 242 includes a first threaded section, a first rod body section and a first stop section sequentially connected along the direction from the first bottle body clamping part 222 to the first connecting part 221. Specifically, the diameter of the first rod body section is smaller than the diameter of the first guide hole, the diameter of the first stop section is greater than the diameter of the first guide hole, and the first threaded section passes through the first guide hole and is threaded to the first threaded hole. After the first bottle body clamping part 222 presses against the bottle body, the first spring is compressed, and the first bottle body clamping part 222 moves in the direction close to the first connecting part 221. The first bottle body clamping part 222 moves to drive the first guide rod 242 to move. The elasticity of the first spring will be damaged after repeated compression for a long time. The above configuration facilitates timely replacement of the first spring, ensuring the elasticity of the first spring, and thus ensuring the clamping effect of the first bottle body clamping part 222 on the bottle body.

In an implementation, second guide holes are formed in the first bottle body clamping part 222. The number of the second guide holes is the same as that of the first guide rods 242. The second guide holes are correspondingly arranged with the first guide rods 242. The axis direction of the second guide hole is the same as the extension direction of the first guide rod 242. One end of the first guide rod 242 is fixedly connected to the first connecting part 221. The other end of the first guide rod 242 is inserted into the second guide hole and is movable in the second guide hole. The first guide rod 242 is in match with the second guide hole to guide the movement of the first bottle body clamping part 222 relative to the first connecting part 221. The end of the first connecting part 221 near the first bottle body clamping part 222 is provided with the second threaded holes. The number of the second threaded holes is the same as the number of the second guide holes. The second threaded hole is opposite to the second guide hole. The second guide hole is a blind hole in a step-like manner. The second guide hole includes the first through hole and the second through hole in communication with each other. The first through hole is arranged near the first connecting part 221. The diameter of the first through hole is smaller than the diameter of the second through hole. The first guide rod 242 is cylindrical, and the first guide rod 242 includes a first clamping part and a first main body section that are sequentially connected. The diameter of the first clamping part is greater than the diameter of the first main body section. The first clamping part is movably arranged in the second threaded hole. One end of the first main body section that is far away from the first clamping part passes through the second through hole and the first through hole in sequence and is threaded to the second threaded hole. After the first bottle body clamping part 222 presses against the bottle body, the first bottle body clamping part 222 moves in the direction close to the first connecting part 221 under the action of the first spring. The second through hole provides an avoidance space for the movement of the first bottle body clamping part 222. By this configuration, the situation where the end of the first guide rod 242 protrudes from the first bottle body clamping part 222 during the movement of the first bottle body clamping part 222 can be avoided, thereby avoiding interference when the first guide rod 242 clamps the bottle body and ensuring the smoothness of clamping the bottle body.

In this embodiment, the second clamping assembly 23 includes a second bottle body clamping part 231 and a second connecting part 232. The second bottle body clamping part 231 is arranged opposite to the first bottle body clamping part 222, and the second bottle body clamping part 231 is in cooperation with the first bottle body clamping part 222 to clamp the bottle body. The second connecting part 232 is connected to the second bottle body clamping part 231, and the second connecting part 232 is arranged at the side of the second bottle body clamping part 231 away from the first bottle body clamping part 222. The second bottle body clamping part 231 and the second connecting part 232 are both block shaped structures. The length direction of the second bottle body clamping part 231 is the same as that of the first bottle body clamping part 222. The length direction of the second connecting part 232 is the same as that of the second bottle body clamping part 231. The second bottle body clamping part 231 is arranged right opposite to the first bottle body clamping part 222. By this configuration, the uniformity of force on the bottle body can be ensured, and the possibility of the bottle body being crushed due to uneven force on the bottle body can be reduced.

In an implementation, two first connecting threaded holes are formed in the end face of the second bottle body clamping part 231 at one end near the second connecting part 232. The two first connecting threaded holes are distributed along the length direction of the second bottle body clamping part 231. The extension direction of the first connecting threaded hole is perpendicular to the length direction of the second bottle body clamping part 231. Two second connecting threaded holes are formed in the end face of the second connecting part 232 at one end near the second bottle body clamping part 231. The first connecting threaded hole is opposite to the second connecting threaded hole, and the second connecting threaded hole penetrates through the second connecting part 232. The second clamping assembly 23 further includes two connecting screws 233. The two connecting screws 233 and the second threaded holes are arranged in a one-to-one correspondence manner. One end of the connecting screw 233 passes through the second threaded hole and is threaded to the first threaded hole. This configuration facilitates the assembly and disassembly of the second connecting part 232 and the second bottle body clamping part 231.

In this embodiment, one end of the first bottle body clamping part 222 near the second bottle body clamping part 231 has a first bottle body clamping surface, and there are a plurality of contact regions between the first bottle body clamping surface and the bottle body and an angle is formed between the plurality of contact regions of the first bottle body clamping surface. One end of the second bottle body clamping part 231 near the first bottle body clamping part 222 has a second bottle body clamping surface. The second bottle body clamping surface and the first bottle body clamping surface have a same structure and form a mirror symmetrical structure. Specifically, the first bottle body clamping surface and the second bottle body clamping surface are both V-shaped. When clamping the bottle body, the first bottle body clamping surface and the second bottle body clamping surface are opposite to each other and both press against the bottle body. By this configuration, the uniformity of force on the bottle body can be ensured, and bottle bodies of different sizes and different shapes can be clamped, improving the adaptability of the device.

In an implementation, both the first bottle body clamping surface and the second bottle body clamping surface are trapezoidal.

In an implementation, the contact region between the first bottle body clamping surface and the bottle body is at a cambered surface of the first bottle body clamping surface, and the contact region between the second bottle body clamping surface and the bottle body is at a cambered surface of the second bottle body clamping surface. The axis direction of the cambered surface of the first bottle body clamping surface and the axis direction of the cambered surface of the second bottle body clamping surface are both vertical. By this configuration, the uniformity of force on the bottle body can be ensured and the possibility of the bottle being crushed can be reduced.

In an implementation, the contact region between the first bottle body clamping surface and the bottle body is at a planar surface of the first bottle body clamping surface, and the contact region between the second bottle body clamping surface and the bottle body is at a planar surface of the second bottle body clamping surface. The planar surface of the first bottle body clamping surface and the planar surface of the second bottle body clamping surface are both vertically arranged planes. By this configuration, the contact area between the planar surface of the first bottle body clamping surface and the bottle body can be increased, and the contact area between the planar surface of the second bottle body clamping surface and the bottle body can be increased, improving the stability of clamping the bottle body.

In this embodiment, the first bottle body clamping surface and the second bottle body clamping surface are both provided with a first elastic structure. The first elastic structure is an elastic pad. By providing the elastic pad, the rigid contact between the first and second clamping assemblies 22, 23 and the bottle body can be converted into flexible contact, reducing the situation of the bottle body being crushed.

In an implementation, the first elastic structure on the first bottle body clamping surface and the first elastic structure on the second bottle body clamping surface both have a first anti-slip structure provided thereon. The first anti-slip structure is the first anti-slip pattern. By providing the first anti-slip pattern, the friction force between the first and second bottle body clamping parts 222, 231 and the bottle body can be increased, ensuring the stability of clamping the bottle body.

In an implementation, the first anti-slip structure is the first anti-slip particles. By providing the first anti-slip particle, the friction force between the first and second bottle body clamping parts 222, 231 and the bottle body can be increased, ensuring the stability of clamping the bottle body.

In an implementation, the second clamping assembly 23 is fixedly arranged on the support seat 21. The driving mechanism includes a first driving assembly 25. The first driving assembly is drive-connected to the first clamping assembly 22. When clamping the bottle body, the bottle body is engaged with the second clamping assembly 23, and then the first driving assembly 25 is activated. The first driving assembly 25 drives the first clamping assembly 22 close to the bottle body until the first clamping assembly 22 presses against the bottle body, completing the clamping of the bottle body. By this configuration, the second clamping assembly 23 can be used as the reference side, and the position of the first clamping assembly 22 relative to the bottle body can be slightly adjusted through the first driving assembly 25 to ensure the effect of clamping the bottle body.

In an implementation, the first clamping assembly 22 is fixedly arranged on the support seat 21. The driving mechanism includes the second driving assembly 26. The second driving assembly 26 is drive-connected to the second clamping assembly 23. When clamping the bottle body, the bottle body is engaged with the first clamping assembly 22, and then the second driving assembly 26 is activated. The second driving assembly 26 drives the second clamping assembly 23 close to the bottle body until the second clamping assembly 23 presses against the bottle body, completing the clamping of the bottle body. With this configuration, after the second clamping assembly 23 presses against the bottle body, the first spring contracts under the action of the first bottle body clamping part 222. By this configuration, the possibility of the bottle body being crushed can be reduced.

In this embodiment, the drive mechanism includes a first driving assembly 25 and a second driving assembly 26. The first driving assembly 25 is connected to the first clamping assembly 22 to move the first clamping assembly 22 in the direction facing to or opposite the second clamping assembly 23. The second driving assembly 26 is drive-connected to the second clamping assembly 23 to move the second clamping assembly 23 in the direction facing to or opposite the first clamping assembly 22. By this configuration, automatic clamping of the bottle body can be achieved, improving the convenience of bottle body clamping. In this embodiment, the bottle body clamping mechanism further includes a support platform 211. The support platform 211 is arranged on the support seat 21, and the support platform 211 is located between the first clamping assembly 22 and the second clamping assembly 23. The support platform 211 has a sample placement center. When clamping the bottle body, the bottle body is placed on the support seat 21, and then the first driving assembly 25 and the second driving assembly 26 are activated. Under the drive of the first driving assembly 25 and the second driving assembly 26, the first clamping assembly 22 and the second clamping assembly 23 move independently and close to the bottle body. By this configuration, the second clamping assembly 23 can be used as the reference side, and the position of the first clamping assembly 22 relative to the bottle body can be slightly adjusted to ensure the effect of clamping the bottle body.

In an implementation, the support seat 21 is provided with a first sliding slot and a second sliding slot 212 which are located at both sides of the movement direction of the second clamping assembly 23 respectively. The extension direction of the first sliding slot and the extension direction of the second sliding slot 212 are both the same as the direction from the first clamping assembly 22 to the second clamping assembly 23. The first driving assembly 25 includes a first driving member, a first screw rod and a first screw nut pair. Specifically, the first driving member is arranged at the bottom of the support seat 21. The first driving member is the first driving motor. The first driving motor is drive-connected to the first screw rod. The direction from the first driving motor to the first screw rod is the same as the direction from the second clamping assembly 23 to the first clamping assembly 22. The first screw rod is located right below the first sliding slot. The extension direction of the first screw rod is the same as the extension direction of the first sliding slot. One end of the first screw nut pair passes through the first sliding slot and is threaded to the first screw rod, and the other end of the first screw nut pair is drive-connected to the first connecting part 221. When clamping the bottle body, the first driving motor rotates to drive the first screw rod to rotate, and the first screw rod rotates to drive the first screw nut pair to move the first clamping assembly 22. The first screw rod is in cooperation with the first screw nut pair and they have a self-locking function, ensuring stability in clamping the bottle body. The first screw nut pair can stop at any position within the movement stroke of the first screw nut pair, therefore the distance between the first clamping assembly 22 and the second clamping assembly 23 can be adjusted, improving the adaptability of bottle body clamping.

The second driving assembly 26 includes a second driving member 261, a second screw rod 262 and a second screw nut pair 263. Specifically, the second driving member 261 is arranged at the bottom of the support seat 21. The second driving member 261 is the second driving motor. The second driving motor is drive-connected to the second screw rod 262. The direction from the second driving motor to the second screw rod 262 is the same as the direction from the first clamping assembly 22 to the second clamping assembly 23, and the second screw rod 262 is located right below the second sliding slot 212. The extension direction of the second screw rod 262 is the same as the extension direction of the second sliding slot 212. One end of the second screw nut pair 263 passes through the second sliding slot 212 and is threaded to the second screw rod 262, and the other end of the second screw nut pair 263 is drive-connected to the second connecting part 232. Moreover, the bottle body clamping mechanism further includes a first motor protection cover and a second motor protection cover 2611. The first motor protection cover is arranged corresponding to the first driving motor, and the first motor protection cover is arranged on the top surface of the support seat 21 and used to protect the first driving motor. The second motor protection cover 2611 is arranged corresponding to the second driving motor, and the second motor protection cover 2611 is arranged on the top surface of the support seat 21 and used to protect the second driving motor. The above configurations make reasonable use of the space at the bottom and top of the support seat 21, making the overall structure of the device compact.

In an implementation, the bottle body clamping mechanism 20 further includes a first guide rail 271, a first guide block 272 and a second guide block 273. Specifically, the first guide rail 271 is provided on the support seat 21. The first guide block 272 is movably arranged on the first guide rail 271. The first connecting part 221 is arranged on the first guide block 272. The first guide block 272 is connected to the first screw nut pair. The second guide block 273 is movably arranged on the first guide rail 271. The second connecting part 232 is arranged on the second guide block 273. The second guide block 273 is connected to the second screw nut pair 263. By this configuration, the movement of the first clamping assembly 22 and the second clamping assembly 23 can be limited and guided, ensuring the smoothness and straightness of the movement of the first clamping assembly 22 and the second clamping assembly 23, thereby ensuring the uniformity of the force exerted by the first clamping assembly 22 and the second clamping assembly 23 on the bottle body and reducing the possibility of the bottle body being crushed.

In an implementation, the bottle body clamping mechanism 20 further includes a sensor. In this embodiment of the present disclosure, the sensor is arranged on the support seat 21 and is located at one side of the support platform 211. The sensor is used to detect whether there is a bottle body between the first clamping assembly 22 and the second clamping assembly 23.

In an implementation, the sensor is arranged on the support platform 211.

In an implementation, the sensor includes a signal receiver and a signal transmitter. The signal transmitter is arranged on the support platform 211, and the signal receiver is arranged on the support seat 21.

In this embodiment, a first reset sensor and a first stopper are further included. The first reset sensor is arranged on the support seat 21 and is located at one side of the movement direction of the first connecting part 221. The first stopper is arranged on the first screw nut pair. The first reset sensor is in cooperation with the first stopper to limit the movement stroke of the first screw nut pair.

In this embodiment of the present disclosure, a second reset sensor 291 and a second stopper 292 are further included. The second reset sensor 291 is arranged on the support seat 21 and is located at one side of the second connecting part 232. The second stopper 292 is arranged on the second screw nut pair 263. The second reset sensor 291 is in cooperation with the second stopper 292 to limit the movement stroke of the second screw nut pair 263.

Figure 6:
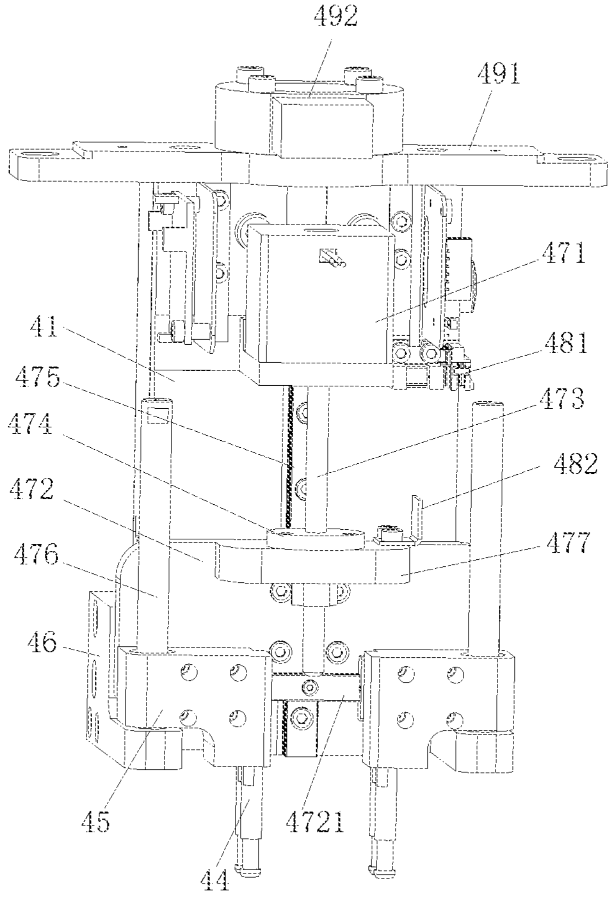
FIG. 6 is a view showing the bottle cap clamping mechanism according to an embodiment of the present disclosure.
Figure 7:
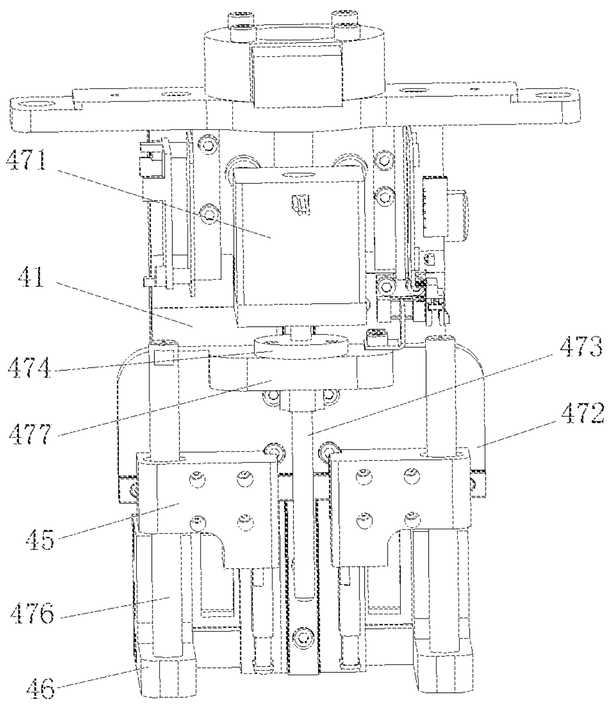
FIG. 7 is a view showing the bottle cap clamping mechanism according to an embodiment of the present disclosure, with the first lifting plate being lifted up.
Figure 8:
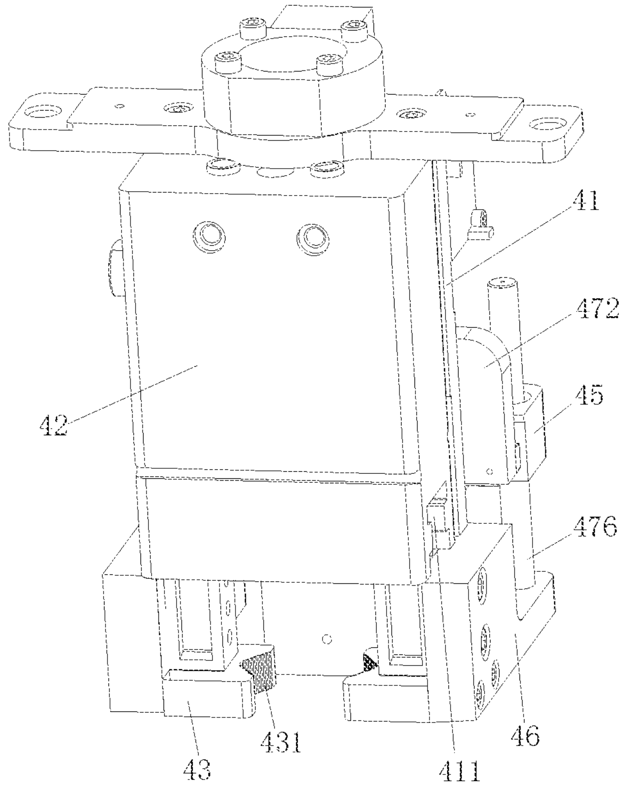
FIG. 8 shows the bottle cap clamping mechanism according to an embodiment of the present disclosure, viewing from another perspective.
Figure 9:
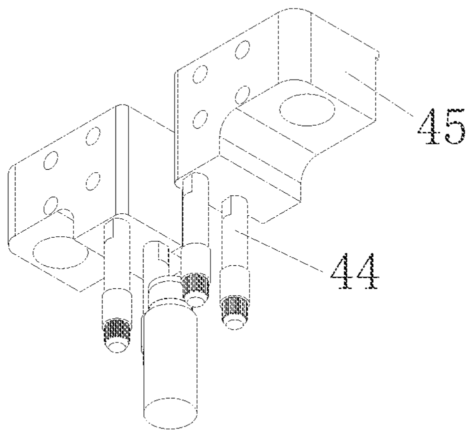
FIG. 9 shows the cooperation of the main body part and the clamping rod according to an embodiment of the present disclosure.
Figure 10:
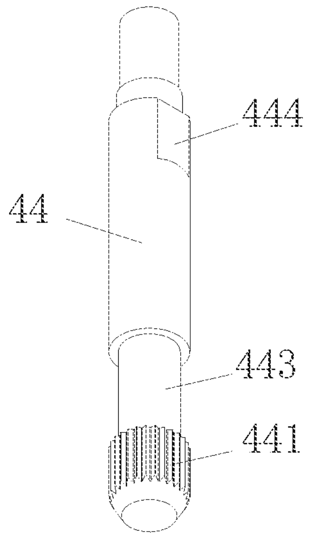
FIG. 10 shows the clamping rod according to an embodiment of the present disclosure.

Referring to FIGS. 6 to 8, the bottle cap clamping mechanism 40 includes a body 41, a third driving member (a driving member) 42, and a first gripper assembly and a second gripper assembly which are arranged independently. The third driving member 42 is arranged on the body 41. The third driving member 42 is drive-connected to the first gripper assembly and the second gripper assembly respectively so as to drive the first gripper assembly and the second gripper assembly to clamp the bottle cap separately.

According to the technical solutions of applying an embodiment of the present disclosure, the bottle cap clamping mechanism 40 is provided with a first gripper assembly and a second gripper assembly. When it is needed to clamping the bottle cap, the first gripper assembly or the second gripper assembly can be selected to clamp the bottle cap based on the type of the bottle cap or the circumstance in which the bottle cap is located. Compared with traditional technical solutions, in this embodiment, the first gripper assembly and the second gripper assembly are both driven by the third driving member 42, thereby reducing the number of the driving members and the size of the bottle cap clamping mechanism 40, and reducing the weight and cost of the bottle cap clamping mechanism 40. Moreover, the first gripper assembly and the second gripper assembly can perform gripping actions independently, facilitating the clamping of different types of bottle caps and expanding the application scope of the bottle cap clamping mechanism 40.

The first gripper assembly and the second gripper assembly may have the same structure, or have different structures. In this embodiment, the first gripper assembly and the second gripper assembly have different structures. By this configuration, the bottle cap clamping mechanism 40 can take different types of bottle caps, further expanding the applicable scenarios of the bottle cap clamping mechanism 40 and expanding its application scope. Moreover, the first gripper assembly and the second gripper assembly are located at two sides of the body 41 respectively. The first gripper assembly and the second gripper assembly may be located at two adjacent sides of the body 41 respectively, or located at two opposite sides of the body 41 respectively, or located at the same side of the body 41. In this embodiment, the body 41 extends in the vertical direction, and the first gripper assembly and the second gripper assembly are located at two opposite sides of the body 41 respectively. By this configuration, mutual interference between the first gripper assembly and the second gripper assembly during operation can be avoided, improving the flexibility of the bottle cap clamping mechanism 40. The position of at least one of the first gripper assembly and the second gripper assembly relative to the body 41 is adjustable. In this embodiment, the position of the second gripper assembly relative to the body 41 is adjustable. When using the second gripper assembly to clamp the bottle cap, the second gripper assembly is adjusted to a suitable position, then the bottle cap is clamped by the second gripper assembly. After clamping is completed, the position of the second gripper assembly can be adjusted again as needed to complete the entire clamping action. By this configuration, the flexibility of the bottle cap clamping mechanism 40 can be further improved, its application scope can be expanded, facilitating opening and tightening of the bottle cap.

In an implementation, the first gripper assembly includes a plurality of first bottle cap clamping parts 43. Each of the first bottle cap clamping parts 43 has a first bottle cap clamping surface, and the plurality of first bottle cap clamping parts 43 are in cooperation with each other through a plurality of first bottle cap clamping surfaces to clamp the bottle cap. When it is needed to clamp an object, the plurality of first bottle cap clamping parts 43 of the first gripper assembly approach the bottle cap to be clamped until the plurality of first bottle cap clamping surfaces all press against the bottle cap to be clamped. By arranging the plurality of clamping parts, bottle caps of different sizes and different shapes can be clamped, improving the adaptability of the first gripper assembly.

In an implementation, a contact region between the first bottle cap clamping surface of the first bottle cap clamping part 43 and the bottle cap is at a cambered surface or a planar surface of the first bottle cap clamping surface. Alternatively, there are a plurality of contact regions between the first bottle cap clamping surface of the first bottle cap clamping part 43 and the bottle cap, and an angle is formed between the plurality of contact regions of the first bottle cap clamping surface. By this configuration, the contact area between the first bottle cap clamping surface and the bottle cap can be increased, further improving the stability of the first gripper assembly when clamping the bottle cap.

In this embodiment, the first bottle cap clamping part 43 is in a block structure, and the number of the first bottle cap clamping parts 43 is two. The two first bottle cap clamping parts 43 are arranged opposite each other. The first bottle cap clamping surface of the first bottle cap clamping part 43 is V-shaped. By this configuration, the uniformity of the force on the bottle cap can be ensured, and the stability when clamping the bottle cap can be ensured. Moreover, the two V-shaped first bottle cap clamping surfaces are arranged opposite each other, which realizes the clamping of bottle caps of different sizes and different shapes and expands the application scope of the first gripper assembly.

In an implementation, the first gripper assembly further includes at least one of a second anti-slip structure 431 and a second elastic structure. In the case that the first gripper assembly includes a second elastic structure, the second elastic structure can be an elastic pad made of rubber, and the second elastic structure is provided on the first bottle cap clamping surface. By providing the second elastic structure, the rigid contact between the first bottle cap clamping part 43 and the bottle cap can be avoided, reducing the possibility of the clamped object being crushed. In the case that the first gripper assembly includes a second anti-slip structure 431, the second anti-slip structure 431 is provided on the first bottle cap clamping surface. The second anti-slip structure 431 can be a second anti-slip pattern, a second anti-slip particle, or a second anti-slip pad. By providing the second anti-slip structure 431, the friction force between the first bottle cap clamping part 43 and the bottle cap can be increased, improving the stability of the first bottle cap clamping part 43 when clamping the bottle cap. The second anti-slip pattern can be inclined stripes, vertical stripes, horizontal stripes, or grid stripes, and this solution does not limit the specific form of stripes. In this embodiment, the first gripper assembly includes a second anti-slip structure 431 which is a second anti-slip pattern provided on the first bottle cap clamping surface, and the second anti-slip pattern is a vertical striped structure.

In an implementation, the second gripper assembly includes a plurality of clamping rods 44 which cooperate with each other to clamp the bottle cap. In this embodiment, the clamping rod 44 extend in the vertical direction, and the plurality of clamping rods 44 are distributed in a circular shape. When the bottle cap is to be clamped by the second gripper assembly, the third driving member 42 drives the plurality of clamping rods 44 close to the bottle cap until the plurality of clamping rods 44 all press against the bottle cap, completing the clamping of the bottle cap. By this configuration, the contact area between the clamping rods 44 and the bottle cap can be increased, improving the stability of the second gripper assembly when clamping the bottle cap. Moreover, in this arrangement, the plurality of clamping rods 44 is reasonably distributed, which can reduce the space occupied by the second gripper assembly and facilitate extending the plurality of clamping rods 44 to the periphery of the bottle cap to perform the clamping action, improving the flexibility when clamping the bottle cap.

As shown in FIGS. 9 to 13, the clamping rod 44 includes a first clamping segment. The first clamping segment has a second bottle cap clamping surface which is used for clamping the bottle cap. The second bottle cap clamping surface of at least one of the clamping rods 44 is a planar surface or a cambered surface. In this embodiment, the first clamping segment of the clamping rod 44 is at the lower end of the clamping rod 44, and all of the second bottle cap clamping surfaces of the plurality of second clamping rods 44 are cambered surfaces. The axis direction of the second bottle cap clamping surface is in the vertical direction. By this configuration, the second bottle cap clamping surfaces of the plurality of clamping rods 44 can all make contact with the bottle cap when the plurality of clamping rods 44 clamp the bottle cap, thereby improving the stability of the second gripper assembly in clamping the bottle cap.

In an implementation, a third anti-slip structure 441 is provided on the second bottle cap clamping surface. By providing the third anti-slip structure 441, the friction force between the second bottle cap clamping surface and the bottle cap can be increased, improving the stability of the second gripper assembly in clamping the bottle cap. The third anti-slip structure 441 is a third anti-slip pattern, and the third anti-slip pattern is provided on the second bottle cap clamping surface. The third anti-slip pattern can be an inclined pattern or a grid pattern, and this solution does not limit the specific shape of the pattern. In this embodiment, the third anti-slip structure 441 is a vertical anti-slip pattern.

In an implementation, the clamping rod 44 is a cylinder, and the number of the clamping rods 44 is three or more. In this embodiment, the peripheral surface of the clamping rod 44 forms the second bottle cap clamping surface, and the fourth anti-slip patterns are distributed on the second bottle cap clamping surface in a circular shape. In this embodiment, the number of the clamping rods 44 is four, and the four clamping rods 44 are arranged in pairs opposite each other and distributed in a circular shape. By this configuration, four clamping rods 44 can be circularly distributed around the outer peripheral of the bottle cap, ensuring the uniformity of the force on the bottle cap and improving the stability in clamping the bottle cap.

In an implementation, the clamping rod 44 further includes a second clamping segment which is connected to the first clamping segment and is located above the first clamping segment. A third elastic structure 442 is provided on the second clamping segment. The second clamping segment is provided with a clamping groove 443. The clamping groove 443 is in a circular structure. The third elastic structure 442 is also in a circular structure. The third elastic structure 442 is clamped to the second clamping segment through the clamping groove 443. The peripheral surface of the third elastic structure 442 protrudes from the second clamping segment. When it is needed to clamp containers that are easily damaged or containers with a longer bottle body, the second clamping segment can be used. When it is needed to clamp containers that are not easily damaged or containers with a shorter bottle body, the first clamping segment can be used. This configuration facilitates to clamp different types of containers by the second gripper assembly, improving the adaptability of the bottle cap clamping mechanism 40.

Figure 11:
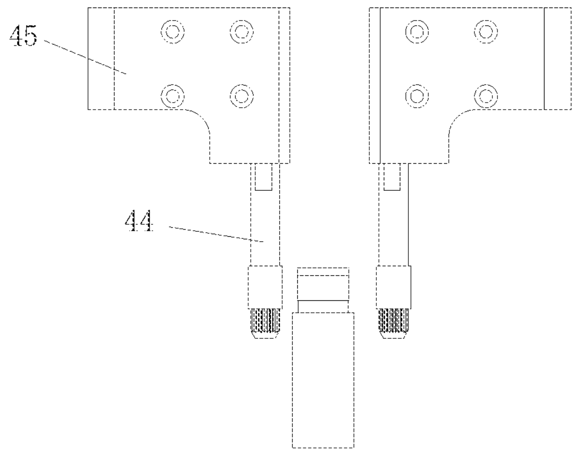
FIG. 11 is a main view showing the cooperation of the main body part and the clamping rod according to an embodiment of the present disclosure.
Figure 12:
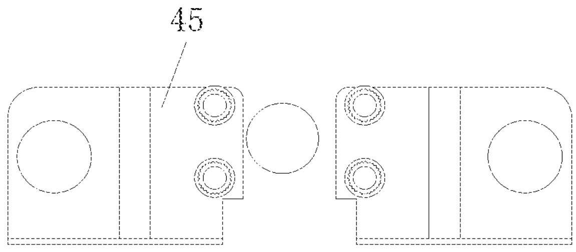
FIG. 12 is a top view showing the cooperation of the main body part and the clamping rod according to an embodiment of the present disclosure.
Figure 13:
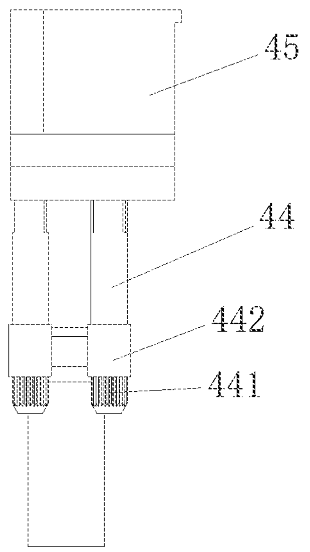
FIG. 13 is a side view showing the cooperation of the main body part and the clamping rod according to an embodiment of the present disclosure.

As shown in FIGS. 11 to 13, the second gripper assembly further includes a plurality of main body parts 45. Each of the plurality of main body parts 45 is connected to at least one clamping rod 44. The clamping rod 44 is below the main body part 45. The third driving member 42 is drive-connected to the main body part 45. The third driving member 42 drives the clamping rod 44 to move through the main body part 45. The clamping rod 44 is detachably connected to the main body part 45. The clamping rod 44 can be detachably connected to the main body part 45 by clamping or through a fastener. In this embodiment, the bottom of the main body part 45 is provided with threaded holes, and the top of the clamping rod 44 is in threaded connection with the main body part 45 through the threaded hole. This configuration facilitates the replacement of the clamping rods 44 with different specifications and sizes so that clamping rods 44 of different types and specifications can be selected to clamp different types of bottle cap, improving the adaptability of the bottle cap clamping mechanism 40. Specifically, the peripheral surface the clamping rod 44 near the top is provided with a cut surface 4221 for wrench which facilitates to clamp the clamping rod 44.

In an implementation, the bottle cap clamping mechanism 40 further includes a plurality of third connecting parts 46. Each of the third connecting parts 46 is connected to at least one of the main body parts 45. The third driving member 42 is drive-connected to the third connecting part 46, and the third driving member 42 drives the main body part 45 to move through the third connecting part 46. When it is needed to clamp the bottle cap, the third driving member 42 drives the third connecting part 46 to move, the third connecting part 46 drives the main body part 45 to move when it moves, and when the main body part 45 moves, it drives the clamping rods 44 to move so as to complete clamping the bottle cap.

In an implementation, the third connecting part 46 includes a first connecting segment and a second connecting segment connected at an included angle, the third driving member 42 is connected to the first connecting segment of the third connecting part 46, and the second connecting segment of the third connecting part 46 is connected to the main body part 45. One end of the first connecting segment of the third connecting part 46 far from the second connecting segment of the third connecting part 46 is above the second connecting segment of the third connecting part 46. The first connecting segment of the third connecting part 46 and the second connecting segment of the third connecting part 46 form an integrally-formed structure. Specifically, the first connecting segment of the third connecting part 46 extends in the vertical direction, and the second connecting segment of the third connecting part 46 extends in the horizontal direction. After the first connecting segment of the third connecting part 46 is in connection with the second connecting segment of the third connecting part 46, an L-shaped structure is formed. The second connecting segment of the third connecting part 46 is connected with the main body part 45 at an included angle. After the second connecting segment of the third connecting part 46 is in connection with the main body part 45, an L-shaped structure is formed. Specifically, the main body part 45 includes a first main body segment and a second main body segment sequentially connected in the horizontal direction. The first main body segment is located above the second connecting segment of the third connecting part 46, and the end face of the bottom of the second main body segment is lower than the end face of the bottom of the first main body segment. After the main body part 45 is in connection with the clamping rod 44, an L-shaped structure is formed. Specifically, the clamping rod 44 is connected to the bottom of the second main body segment of the main body part 45.

In this embodiment, the number of the third connecting parts 46 is two, and the two third connecting parts 46 are arranged opposite each other. The main body part 45 is between the two third connecting parts 46. Moreover, the number of the main body parts 45 is two, the two main body parts 45 are arranged opposite each other, and the main body parts 45 are connected to the third connecting part 46 in a one-to-one correspondence manner. The number of the clamping rods 44 is four, and one of the main body parts 45 is correspondingly connected to two of the clamping rods 44. The clamping rods 44 on the two main body parts 45 are arranged opposite each other. Specifically, two third connecting parts 46 are distributed along the width direction of the body 41. By this arrangement, the compact structure of the bottle cap clamping mechanism 40 can be assured. Moreover, with this arrangement, the four clamping rods 44 are divided into two groups, and the two groups of clamping rods 44 are arranged opposite each other. When clamping the bottle cap, the four clamping rods 44 are on the outer peripheral surface of the bottle cap, ensuring the stability of clamping the bottle cap.

In an implementation, the first gripper assembly includes two first bottle cap clamping parts 43 arranged opposite each other, the first bottle cap clamping parts 43 are connected to the third connecting parts 46 in a one-to-one correspondence manner, and the first bottle cap clamping part 43 is between the two third connecting parts 46. The third connecting part 46 is movably arranged at the bottom of the body 41, and both ends of the third connecting part 46 extend to two sides of the body 41. Specifically, the bottom of the body 41 is formed with a guide slot 411 which is horizontally arranged, and the extension direction of the guide slot 411 is the same as that of the body 41. A guide block is provided at the top of the third connecting part 46. The guide block is movably arranged in the guide slot 411. The section of the guide slot 411 is in an I shape. By this configuration, the guide block can be prevented from coming out of the guide slot 411 and the moving smoothness of the guide block can be improved. The main body part 45 and the first bottle cap clamping part 43 are respectively located at both sides of the body 41, and are connected to the two ends of the third connecting part 46 respectively. The first bottle cap clamping part 43 is in a block structure, and there is an avoidance space between the top of the first bottle cap clamping part 43 and the body 41, so that the top of the bottle cap can pass through the avoidance space. This configuration facilitates the first bottle cap clamping part 43 to clamp the bottle cap, avoiding interference from the body 41 and other components in the clamping action of the first bottle cap clamping part 43.

In an implementation, the bottle cap clamping mechanism 40 further includes a displacement mechanism arranged on the body 41. The displacement mechanism is drive-connected to the first gripper assembly and/or the second gripper assembly to adjust the position of the first gripper assembly and/or the position of the second gripper assembly relative to the body 41. In this embodiment, the displacement mechanism is arranged on the body 41 and is drive-connected to the second gripper assembly to adjust the position of the second gripper assembly relative to the body 41.

In an implementation, the displacement mechanism includes a lifting structure which includes a fourth driving member (another driving member) 471 and a first lifting plate 472. The fourth driving member 471 is arranged on the body 41. The first lifting plate 472 is movably arranged at one side of the body 41, and the first lifting plate 472 is parallel to the body 41. The fourth driving member 471 is drive-connected to the first lifting plate 472. The first lifting plate 472 is provided with a first limit part 4721, and the main body part 45 is slidably connected to the first limit part 4721. The fourth driving member 471 drives the second gripper assembly to rise or descend through the first lifting plate 472. By including the lifting structure, automatic rising or descending of the second gripper assembly can be realized, thereby improving the convenience for staff to adjust the height of the second gripper assembly relative to the body 41. Moreover, in this embodiment, the third driving member 42 is arranged on the body 41, and the third driving member 42 does not need to rise or descend together with the second gripper assembly. In this way, the lifting weight can be reduced, the load of the lifting structure can be reduced, and the flexibility of the lifting action can be improved.

The first limit part 4721 extends in the horizontal direction, and the first limit part 4721 can be the first limit slot. The main body part 45 is movably arranged in the first limit slot. In this embodiment, the first limiting part 4721 is the first guide rail, two main body parts 45 are distributed along the extension direction of the first guide rail, and the third connecting part 46 is movably arranged on the first guide rail. The third driving member 42 drives the two third connecting parts 46 to synchronously move towards each other or in opposite directions. The first guide rail has a simple structure and can avoid mutual contact between the main body part 45 and the body 41, improving the moving smoothness of the main body part 45. Moreover, with this configuration, the two main body parts 45 can both move in the horizontal direction synchronously, thereby ensuring that the movement strokes of the two main body parts 45 remain consistent during a single clamping process, which ensures that the clamping forces on the bottle cap from the two main body parts 45 remain consistent, thereby further improving the stability of clamping the bottle cap. Moreover, the first guide rail 271 is arranged near the bottom of the first lifting plate 472, which can maximize the travel range of the second gripper assembly and facilitate the bottle cap clamping mechanism 40 to clamp bottle caps at different heights.

The fourth driving member 471 can be a driving cylinder. The driving cylinder is arranged on the body 41 and drive-connected to the first lifting plate 472. This configuration has a simple structure and convenient operation. In this embodiment, the fourth driving member 471 is a driving motor. The lifting structure further includes a third screw rod 473, a third screw nut pair 474, and a second limit part 475. The fourth driving member 471 is drive-connected to the third screw rod 473. The third screw nut pair 474 is threaded to the third screw rod 473. The third screw nut pair 474 is connected to the first lifting plate 472. The second limit part 475 is provided on the body 41. The first lifting plate 472 is slidably connected to the second limit part 475. The fourth driving member 471 drives the first lifting plate 472 to rise or descend along the second limit part 475 through the cooperation of the third screw rod 473 and the third screw nut pair 474. When adjusting the height of the first lifting plate 472 relative to the body 41, the drive motor is started and drives the third screw rod 473 to rotate. When the third screw rod 473 rotates, it drives the third screw nut pair 474 to drive the first lifting plate 472 to rise or descend. The third screw rod 473 and the third screw nut pair 474 have a simple structure and stable transmission. Moreover, the third screw rod 473 and the third screw nut pair 474 have self-locking function, which can ensure the stability of the first lifting plate 472 when it is in a static state, and thus ensure the stability of the second gripper assembly when clamping the bottle cap.

In an implementation, the first lifting plate 472, the third screw rod 473, the third screw nut pair 474 and the driving motor are all at the same side of the body 41. The movement direction of the first lifting plate 472 and the extension direction of the third screw rod 473 are both vertical. The driving motor is arranged near the top of the body 41 and the third screw rod 473 is below the driving motor. The third driving member 42 is located at one side of the body 41 away from the first lifting plate 472. By this arrangement, the compactness of the overall structure of the bottle cap clamping mechanism 40 can be assured, thereby facilitating to clamp the clamped object in a narrow space.

In this embodiment, the displacement mechanism further includes a connecting block 477. The connecting block 477 is fixedly connected to the third screw nut pair 474. The third screw rod 473 is arranged on the connecting block 477 in a penetration mode. The connecting block 477 is fixedly connected to the first lifting plate 472. Alternatively, the connecting block 477 can be integrally formed with the first lifting plate 472. The connecting block 477 can function as a transitional connection, improving the stability of the connection between the third screw nut pair 474 and the first lifting plate 472.

The second limit part 475 is vertically arranged. The second limit part 475 can be the second guide rail. The first lifting plate 472 is movably arranged on the second guide rail. In this embodiment, the second limit part 475 is the second limit slot which is arranged at one side of the body 41 near the first lifting plate 472. A limit block is provided on the first lifting plate 472. The limit block is movably arranged in the second limit slot. The second limit slot and the limit block can guide and limit rising or descending of the first lifting plate 472, ensuring the smooth movement of the first lifting plate 472.

In an implementation, the lifting structure further includes a plurality of third guide rods 476. Each of the third connecting parts 46 is provided with at least one third guide rod 476. The third guide rods 476 are slidably connected to the main body parts 45 in a one-to-one correspondence manner. The first lifting plate 472 drives the main body parts 45 to rise or descend along the third guide rods 476. The third connecting part 46 drive the second clamping assembly to clamp the object through the third guide rod 476 and the first limit part 4721. In this embodiment, the lifting structure includes two third guide rods 476, and each third connecting part 46 is provided with a third guide rod 476. The third guide rod 476 is vertically provided on the top surface of the second connecting segment of the third connecting part 46. The first main body segment of the main body part 45 is movably arranged on the third guide rod 476 in a penetration mode. The third guide rod 476 has a simple structure and occupies a small space, which can ensure the compactness of the overall structure of the device. Moreover, in this solution, the third guide rod 476 is in cooperation with the third connecting part 46 and the second limit slot is in cooperation with the limit block on the first lifting plate 472, which can ensure the smoothness of synchronous rising or descending of the third connecting part 46 and the first lifting plate 472.

In an implementation, the fourth driving member 471 is above the first lifting plate 472. The lifting structure further includes a limit sensor 481 and a limit baffle 482. The limit sensor 481 is arranged below and adjacent to the fourth driving member 471. The limit baffle 482 is arranged above the first lifting plate 472. The baffle 751 can limit the displacement of the lifting plate 72 in combination with the limit sensor 481. The limit sensor 481 is electrically connected to the fourth driving member 471. When the first lifting plate 472 rises to approach the fourth driving member 471, the limit sensor 481 and the limit baffle 482 sense each other, the limit sensor 481 transmits the position signal of the first lifting plate 472 to the fourth driving member 471, the fourth driving member 471 is stopped, and the first lifting plate 472 stops rising. Through the cooperation of the limit baffle 482 and the limit sensor, the displacement of the first lifting plate 472 can be limited, and collision between the first lifting plate 472 and the fourth driving member 471 can be therefore avoided.

As showing in FIG. 6, the bottle cap clamping mechanism 40 further includes a quick-change connecting plate 491 and a pneumatic quick-change connector 492. Specifically, the quick-change connecting plate 491 is arranged on the body 41, and the pneumatic quick-change connector 492 is arranged on the quick-change connecting plate 491. In the use, the pneumatic quick-change connector 492 can be fixed on a peripheral mechanical arm, and the entire bottle cap clamping mechanism 40 can be controlled to move through the mechanical arm. By providing the pneumatic quick-change connector 492 and the quick-change connecting plate 491, the convenience of connecting the entire bottle cap clamping mechanism 40 with the peripheral mechanical arm can be improved, improving the efficiency of installing the bottle cap clamping mechanism 40 to the peripheral mechanical arm.

It can be understood that the bottle cap clamping mechanism 40 can alternatively include only one set of gripper assembly. Specifically, the bottle cap clamping mechanism 40 includes a body 41, a third driving member 42, and a gripper assembly. Specifically, the third driving member 42 is arranged on the body 41. The third driving member 42 is drive-connected to the gripper assembly to drive the gripper assembly to clamp the bottle cap. Specifically, the gripper assembly can be the first gripper assembly described above, the second gripper assembly described above, or a gripper assembly which is currently common on the market. The embodiments of the present disclosure do not limit it.

Figure 14:
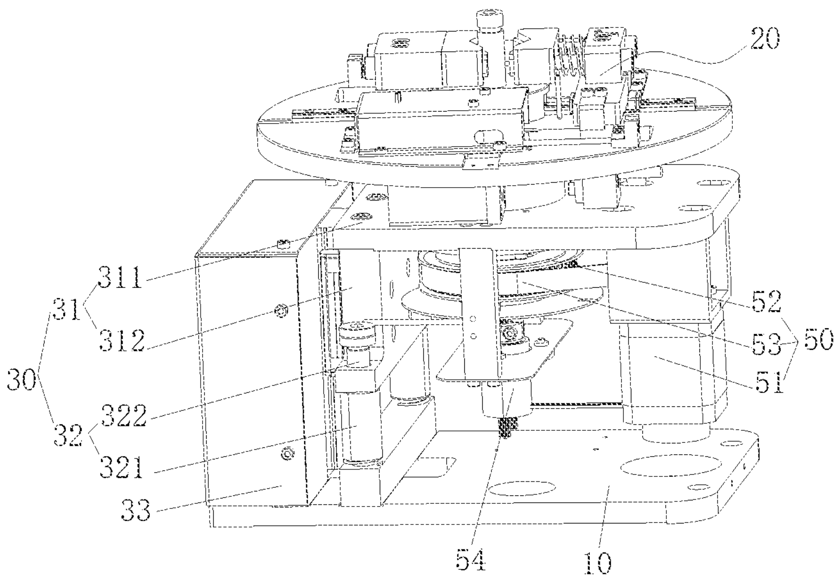
FIG. 14 shows the cooperation of the first buffer mechanism and the bottle body clamping mechanism according to an embodiment of the present disclosure.

As shown in FIGS. 2 and 14, the first buffer mechanism 30 includes a second lifting plate (a lifting plate) 31 and a third buffer component (a buffer component) 32. Specifically, the height of the second lifting plate 31 relative to the base 10 is adjustable, and the bottle body clamping mechanism 20 is arranged on the second lifting plate 31. The third buffer component 32 is arranged between the base 10 and the second lifting plate 31, and the second lifting plate 31 is able to rise or descend relative to the base 10 through the third buffer component 32. When opening the bottle cap, the height of the bottle cap clamping mechanism 40 relative to the base 10 remains unchanged. After the rotation driving mechanism 50 is activated, the rotation driving mechanism 50 drives the bottle body clamping mechanism 20 to rotate clockwise. The bottle body clamping mechanism 20 rotates to drive the bottle body to rotate. During the rotation of the bottle body, the position of the bottle cap remains unchanged. Therefore, during the process of rotating and detaching from the thread of the bottle cap, the bottle body is subjected to the reaction force of the thread lead and moves vertically downwards, and the third buffer component 32 is compressed until the bottle body separates from the bottle cap, completing the opening of the bottle cap. The process of tightening the bottle cap is the opposite. The lifting plate can slowly descend or rise under the action of the third buffer component 32, thereby ensuring the stability of the bottle body clamping mechanism 20 during the rising or descending process, and improving the stability of the bottle cap opening or tightening process.

In this embodiment, the rotation driving mechanism 50 includes a rotation driving member 51 and a rotary shaft. Specifically, the rotation driving member 51 is arranged on the second lifting plate 31. The rotary shaft is rotatably arranged on the second lifting plate 31, and the axis direction of the rotary shaft is vertical. One end of the rotary shaft is drive-connected to the rotation driving member 51, and the other end of the rotary shaft is connected to the bottle body clamping mechanism 20. The rotation driving member 51 drives the rotary shaft to rotate so as to drive the bottle body clamping mechanism 20 to rotate.

In an implementation, the rotation driving mechanism 50 further includes a first synchronous wheel 52, a second synchronous wheel and a synchronous belt 53. Specifically, the first synchronous wheel 52 is fixedly connected to the rotary shaft, and the first synchronous wheel 52 is coaxially arranged with the rotary shaft. The second synchronous wheel is fixedly connected to the output shaft, and the second synchronous wheel is coaxially arranged with the output shaft. The synchronous belt 53 is arranged on the outer circumferences of the first synchronous wheel 52 and the second synchronous wheel, and the rotary motor drives the first synchronous wheel 52 to rotate through the cooperation of the second synchronous wheel and the synchronous belt 53. The rotation driving member 51 is a rotary motor which has the output shaft. The axis direction of the output shaft is vertical. The second synchronous wheel is coaxial with the output shaft, and the second synchronous wheel is arranged on the output shaft. The first synchronous wheel 52 is fixedly connected to the rotary shaft, and the first synchronous wheel 52 is coaxially arranged with the rotary shaft. The second lifting plate 31 is a horizontally arranged rectangular plate structure. The first synchronous wheel 52 and the rotary motor are distributed along the length direction of the second lifting plate 31, and the rotary motor is arranged at the bottom of the second lifting plate 31. The bottom end of the rotary shaft is fixedly connected to the first synchronous wheel 52. The top end of the rotary shaft passes through the second lifting plate 31 and is fixedly connected to the support seat 21 of the bottle body clamping mechanism 20. The support seat 21 is a circular plate structure, and the support seat 21 is coaxially arranged with the rotary shaft. The synchronous belt 53 is arranged on the outer circumferences of the first synchronous wheel 52 and the second synchronous wheel. The rotary motor drives the rotary shaft to rotate through the second synchronous wheel, the synchronous belt 53 and the first synchronous wheel 52. By providing the first synchronous wheel 52, the second synchronous wheel and the synchronous belt 53, the stability of the rotary motor driving the rotary shaft can be improved. The bottle cap opening and closing device further includes a sliding ring 54 which is coaxially arranged with the first synchronous wheel 52 and connected to one end of the first synchronous wheel 52 away from the rotary shaft. The signal wires and the control wires of the bottle body clamping mechanism 20, as well as the signal wires and the control wires of the rotation driving mechanism 50, are all arranged inside the sliding ring 54 so as to prevent wire winding and ensure the stability of operation process of the bottle body clamping mechanism 20.

In an implementation, the rotation driving mechanism 50 includes a rotation driving member 51 and a rotary shaft. Specifically, the rotation driving member 51 is arranged on the second lifting plate 31. The rotary shaft is rotatably arranged on the second lifting plate 31, and the axis direction of the rotary shaft is vertical. The rotation driving member 51 is in driving connection with the rotary shaft to rotate the rotary shaft relative to the second lifting plate 31. The rotation driving member 51 is a rotary motor which is arranged at the bottom of the second lifting plate 31. One end of the rotary shaft is arranged on the rotary motor, and the other end of the rotary shaft passes through the second lifting plate 31 and is fixedly connected to the support seat 21 of the bottle body clamping mechanism 20. This configuration allows the rotary motor to directly drive the bottle body clamping mechanism 20 to rotate through the rotary shaft, simplifying the structure of the device.

In this embodiment, the rotation driving mechanism 50 further includes a bearing seat and two bearings. The two bearings are coaxially arranged with each other. The two bearings are arranged on the top of the second lifting plate 31 through the bearing seat, and the two bearings are both sleeved on the rotary shaft and are fit-connected to the rotary shaft. By providing the bearings, the smoothness and stability of the rotation process of the rotary shaft can be further improved.

Specifically, the third buffer component 32 includes a third elastic member. One end of the third elastic member is connected to the second lifting plate 31, and the other end of the third elastic member is connected to the base 10. During the process of opening the bottle cap, the third elastic member is compressed as the second lifting plate 31 descends. During the process of tightening the bottle cap, the third elastic member is restored from the deformation as the second lifting plate 31 rises. The third elastic member can be deformed under an external force and return to its original state after removing the external force. It has strong flexibility and a simple structure.

In this embodiment, two third elastic members are arranged. The two third elastic members, the rotary shaft and the rotary motor are distributed along the length direction of the second lifting plate 31, and the rotary shaft is arranged at the center of the second lifting plate 31. The two third elastic members are distributed along the width direction of the second lifting plate 31. With this arrangement, the spatial layout at the bottom of the second lifting plate 31 is reasonable, realizing the miniaturization of the bottle cap opening and closing device.

Specifically, only one third elastic member is arranged, or a plurality of third elastic members are arranged. In this embodiment, two third elastic members are arranged, and the two third elastic members are spaced along the width direction of the second lifting plate 31.

In this embodiment, the third elastic member is the third spring 321, and the expansion and contraction direction of the third spring 321 is in the vertical direction. The third spring 321 has a simple structure, good buffering effect, and convenient installation.

In an implementation, the third elastic member is the third elastic sheet. One end of the third elastic sheet is connected to the second lifting plate 31, and the other end of the third elastic sheet is connected to the base 10. The third elastic sheet has a simple structure and convenient installation.

In an implementation, the third elastic member is the third rubber block. One end of the third rubber block is connected to the second lifting plate 31, and the other end of the third rubber block is connected to the base 10. The third rubber block has a simple structure and convenient installation.

In this embodiment, the third buffer component 32 further includes fourth guide rods 322. The number of the fourth guide rods 322 is the same as that of the third springs 321. The fourth guide rods 322 and the third springs 321 are arranged in a one-to-one correspondence manner. The fourth guide rod 322 is arranged between the second lifting plate 31 and the base 10. The fourth guide rod 322 is used to guide the second lifting plate 31 to rise or descend relative to the base 10. The third spring 321 is wound on the fourth guide rod 322. This configuration allows the fourth guide rod 322 to guide the second lifting plate 31 to rise or descend relative to the base 10. Moreover, the fourth guide rod 322 can guide the expansion and contraction of the third spring 321, ensuring stability and smoothness during the expansion and contraction process of the third spring 321, thereby improving the smoothness and stability of rising or descending of the second lifting plate 31.

In this embodiment, fifth guide holes are formed in the second lifting plate 31. The number of the fifth guide holes is the same as that of the fourth guide rods 322, and the fifth guide holes and the fourth guide rods 322 are arranged in a one-to-one correspondence manner. One end of the fourth guide rod 322 is fixedly connected to the base 10, and the other end of the fourth guide rod 322 is inserted into the fifth guide hole and is movable in the fifth guide hole. The fourth guide rod 322 is in match with the fifth guide hole to guide the second lifting plate 31 to rise or descend. The axis direction of the fifth guide hole is vertical, and the fifth guide hole is a through hole. The fourth guide rod 322 is vertically arranged on the base 10. The fourth guide rod 322 includes a fourth rod body and a fourth clamping end. The fourth clamping end is arranged at the top of the fourth rod body, and the diameter of the fourth clamping end is greater than the diameter of the fifth guide hole. One end of the fourth rod body far from the fourth clamping end passes through the fifth guide hole and the third spring 321 in sequence and is connected to the base 10. This configuration facilitates the assembly of the second lifting plate 31, the first buffer mechanism 30 and the base 10. Moreover, this configuration allows the fourth clamping end to limit the vertical displacement of the second lifting plate 31, preventing the separation of the second lifting plate 31 from the fourth guide rod 322, and ensuring the smoothness of rising or descending of the second lifting plate 31.

In an implementation, the fifth guide hole is a blind hole arranged in a step-like manner, and the fifth guide hole is opened at the bottom of the second lifting plate 31. The fifth guide hole includes a fifth through hole and a sixth through hole which are in communication with each other. The fifth through hole is arranged near the base 10. The diameter of the fifth through hole is smaller than that of the sixth through hole. The fourth guide rod 322 is cylindrical, and the fourth guide rod 322 includes a fourth rod body and a fourth clamping end connected in sequence. The diameter of the fourth clamping end is greater than the diameter of the fifth through hole, and the fourth clamping end is arranged at the top of the fourth rod body, and the fourth clamping end is movably arranged in the sixth through hole along the axis direction of the sixth through hole. By this configuration, the situation where the clamping end of the fourth guide rod 322 protrudes from the second lifting plate 31 during the rising or descending process of the second lifting plate 31 can be avoided, thereby avoiding mutual interference between the fourth guide rod 322 and the bottle body clamping mechanism 20, and improving the smoothness of rising or descending of the second lifting plate 31.

In an implementation, the third buffer component 32 further includes fourth guide rods 322. The number of the fourth guide rods 322 is the same as that of the third springs 321. The fourth guide rods 322 and the third springs 321 are arranged in a one-to-one correspondence manner. The fourth guide rod 322 is arranged between the second lifting plate 31 and the base 10. The fourth guide rod 322 is used to guide the second lifting plate 31 to rise or descend relative to the base 10, The third spring 321 is wound on the fourth guide rod 322. This configuration allows the fourth guide rod 322 to guide the second lifting plate 31 to rise or descend relative to the base 10. Moreover, the fourth guide rod 322 can guide the expansion and contraction of the third spring 321, ensuring stability and smoothness during the expansion and contraction process of the third spring 321, thereby improving the smoothness and stability of rising or descending of the second lifting plate 31.

Specifically, sixth guide holes are provided in the second lifting plate 31. The number of the sixth guide holes is the same as the number of the fourth guide rods 322, and the sixth guide holes and the fourth guide rods 322 are arranged in a one-to-one correspondence manner. One end of the fourth guide rod 322 is fixedly connected to the base 10, and the other end of the fourth guide rod 322 is inserted into the sixth guide hole and is movable in the sixth guide hole. The fourth guide rod 322 is in match with the sixth guide hole to guide the second lifting plate 31 to rise or descend. The axis direction of the sixth guide hole is vertical, and the sixth guide hole is a through hole. The fourth guide rod 322 is vertically arranged on the base 10. The fourth guide rod 322 includes a fourth rod body and a fourth clamping end. The fourth clamping end is arranged at the top of the fourth rod body, and the diameter of the fourth clamping end is greater than the diameter of the sixth guide hole. The end of the fourth rod body far from the fourth clamping end passes through the sixth guide hole and the third spring 321 in sequence and is connected to the base 10. This configuration facilitates the assembly of the second lifting plate 31, the first buffer mechanism 30 and the base 10. Moreover, this configuration allows the fourth clamping end to limit the vertical displacement of the second lifting plate 31, preventing the separation of the second lifting plate 31 from the fourth guide rod 322, and ensuring the smoothness of rising or descending of the second lifting plate 31.

In an implementation, the sixth guide hole is a blind hole arranged in a step-like manner, and the sixth guide hole is opened at the bottom of the second lifting plate 31. The sixth guide hole includes a seventh through hole and an eighth through hole which are in communication with each other. The fifth through hole is arranged near the base 10. The diameter of the seventh through hole is smaller than that of the eighth through hole. The fourth guide rod 322 is cylindrical, and the fourth guide rod 322 includes a fourth rod body and a fourth clamping end connected in sequence. The diameter of the fourth clamping end is greater than the diameter of the seventh through hole. The fourth clamping end is arranged at the top of the fourth rod body, and the fourth clamping end is movably arranged in the eighth through hole along the axis direction of the eighth through hole. By this configuration, the situation where the clamping end of the fourth guide rod 322 protrudes from the second lifting plate 31 during the rising or descending process of the second lifting plate 31 can be avoided, thereby avoiding mutual interference between the fourth guide rod 322 and the bottle body clamping mechanism 20, and improving the smoothness of rising or descending of the second lifting plate 31.

In this embodiment, the bottle cap opening and closing device further includes a guide part 33 which is arranged between the base 10 and the second lifting plate 31. The second lifting plate 31 is slidably connected to the guide part 33, and the second lifting plate 31 slides on the guide part 33 through the third buffer component 32. The guide part 33 can guide the second lifting plate 31 to rise or descend, improving the smoothness of rising or descending of the second lifting plate 31. In this embodiment, the guide part 33 is a guide plate which is vertically arranged on the base 10. The length direction of the guide plate is perpendicular to the length direction of the second lifting plate 31. The guide plate is located at one end of the second lifting plate 31 in the length direction, and the guide plate is arranged away from the rotary motor. Specifically, the guide part 33 includes a support frame and a third limit part. Specifically, the support frame is arranged on the base 10. The third limit part is arranged on the support frame, and the sliding plate 312 is slidably connected to the third limit part, enabling the sliding plate 312 to rise or descend along the third limit part.

As shown in FIG. 14, the second lifting plate 31 includes a support plate 311 and a sliding plate 312, and the bottle body clamping mechanism 20 is rotatably arranged on the support plate 311. The sliding plate 312, the rotary shaft and the rotary motor are distributed along the length direction of the second lifting plate 31. The sliding plate 312 is a rectangular plate structure arranged vertically, and the length direction of the sliding plate 312 is perpendicular to the length direction of the support plate 311. The sliding plate 312 is arranged at one end of the support plate 311 away from the rotary motor. The top end of the sliding plate 312 is connected to the support plate 311, the bottom end of the sliding plate 312 is located below the support plate 311. The sliding plate 312 is slidably connected to the guide plate, and the third buffer component 32 is arranged at one end of the sliding plate 312 away from the support plate 311.

Specifically, the sliding plate 312 includes a matching section and a sliding main body section sequentially connected in the vertical direction. The sliding main body section is connected to the bottom of the support plate 311, and the matching section is below the sliding main body section. The length of the matching section is greater than the length of the sliding main body section. Both ends of the matching section protrude from the sliding main body section. Two fifth guide holes are respectively formed at the two ends of the matching section. By this configuration, the compactness of the overall structure can be ensured and the matching section can provide avoidance space for the fourth guide rods 322 to avoid interference between the support plate 311 and the fourth guide rods 322 during the rising or descending process of the support plate 311, ensuring the smooth rising or descending of the second lifting plate 31.

In an implementation, the bottle cap opening and closing device further includes a moving mechanism 60. The bottle cap clamping mechanism 40 is arranged on the moving mechanism 60, and the moving mechanism 60 drives the bottle cap clamping mechanism 40 to move. The moving mechanism 60 can drive the bottle cap clamping mechanism 40 to move, improving the stability of the movement and positioning of the bottle cap clamping mechanism 40.

Another embodiment of the present disclosure provides another bottle cap opening and closing device which is different from the above embodiment in that the second buffer mechanism further includes a second buffer component, the second buffer component is arranged between the second bottle body clamping part 231 and the second connecting part 232. One end of the second buffer component is connected to the second bottle body clamping part 231, and the other end of the second buffer component is connected to the second connecting part 232. The second bottle body clamping part 231 is movable relative to the second connecting part 232 through the second buffer component. With this configuration, when the second bottle body clamping part 231 presses against the bottle body, the second bottle body clamping part 231 moves in a direction close to the second connecting part 232 under the action of the second buffer component to reduce the force on the bottle body and further reduce or avoid crushing the bottle body. Specifically, the second buffer component includes a second elastic member. One end of the second elastic member is connected to the second connecting part 232, and the other end of the second elastic member is connected to the second bottle body clamping part 231.

In this embodiment, two second elastic members are arranged, and the two second elastic members are spaced along the length direction of the second bottle body clamping part 231. By this configuration, the buffering effect of the second elastic members on the second bottle body clamping part 231 can be further ensured, ensuring the uniformity of the force exerted by the second bottle body clamping part 231 on the bottle body and reducing the possibility of the bottle body being crushed.

In an implementation, one second elastic member is arranged. One end of the second elastic member is connected to the middle of the side wall of the second bottle body clamping part 231 at one side near the second connecting part 232, and the other end of the second elastic member is connected to the middle of the side wall of the second connecting part 232 at one side near the second bottle body clamping part 231. By this configuration, the uniformity of the force exerted by the second elastic member on the second bottle body clamping part 231 and the uniformity of the force exerted by the second elastic member on the second connecting part 232 can be ensured, further improving the stability of the clamping process of the second bottle body clamping part 231 on the bottle body.

In an implementation, at least three second elastic members are arranged, and the plurality of second elastic members are spaced along the length direction of the second bottle body clamping part 231. By this configuration, the buffering effect of the second elastic members can be further enhanced and the stable movement of the second bottle body clamping part 231 relative to the second connecting part 232 can be ensured.

Specifically, the second elastic member is the second spring, and the expansion and contraction direction of the second spring is the same as the direction from the second connecting part 232 to the second bottle body clamping part 231. One end of the second spring is connected to the second connecting part 232, and the other end of the second spring is connected to the second bottle body clamping part 231. The second spring has a simple structure, good buffering effect, large telescopic amount and convenient installation.

In an implementation, the second elastic member is the second elastic sheet. One end of the second elastic sheet is connected to the second connecting part 232, and the other end of the second elastic sheet is connected to the second bottle body clamping part 231. The second fragment has a simple structure and convenient installation.

In an implementation, the second elastic member is the second rubber block. One end of the second rubber block is connected to the second connecting part 232, and the other end of the second rubber block is connected to the second bottle body clamping part 231. The second rubber block has a simple structure.

In an implementation, the second buffer component further includes second guide rods which are arranged between the second connecting part 232 and the second bottle body clamping part 231. The second guide rods are used to guide the movement of the second bottle body clamping part 231 relative to the second connecting part 232. The number of the second guide rods is the same as the number of the second springs, and the second guide rods are arranged corresponding to the second springs. And the extension direction of the second guide rod is the same as the direction from the second connecting part 232 to the second bottle body clamping part 231. The second spring is wound on the second guide rod. This configuration allows the second guide rod to guide the expansion and contraction of the second spring, ensuring smoothness and stability during the expansion and contraction process of the second spring, thereby improving the smoothness of the movement of the second bottle body clamping part 231 relative to the second connecting part 232, and maximizing the uniformity of the force exerted by the second bottle body clamping part 231 on the bottle body, ensuring smoothness of the clamping process.

In an implementation, third guide holes are formed in the second connecting part 232, and the number of the third guide holes is the same as the number of the second guide rods. The third guide holes are arranged corresponding to the second guide rods. The axis direction of the third guide hole is the same as the extension direction of the second guide rod. One end of the second guide rod is fixedly connected to the second bottle body clamping part 231, and the other end of the second guide rod is inserted into the third guide hole and is movable in the third guide hole. The second guide rod is in match with the third guide hole to guide the movement of the second bottle body clamping part 231 relative to the second connecting part 232. The end of the second bottle body clamping part 231 near the second connecting part 232 is provided with third threaded holes. The number of the third threaded holes is the same as the number of the third guide holes. The third threaded holes are opposite to the third guide holes. The second guide rod includes a second threaded section, a second rod body section and a second stop section sequentially connected along the direction from the second bottle body clamping part 231 to the second connecting part 232. Specifically, the diameter of the second rod body section is smaller than the diameter of the third guide hole, and the diameter of the second stop section is greater than the diameter of the third guide hole. The second threaded section passes through the third guide hole and is threaded to the third threaded hole. When the second bottle body clamping part 231 presses against the bottle body, the second spring is compressed, and the second bottle body clamping part 231 moves in the direction close to the second connecting part 232. The second bottle body clamping part 231 moves to drive the second guide rod to move. After repeated compression for a long time, the elasticity of the second spring is damaged. The above configuration facilitates the timely replacement of the second spring, ensuring the elasticity of the second spring, and thus ensuring the clamping effect of the second bottle body clamping part 231 on the bottle body.

In an implementation, fourth guide holes are formed in the second bottle body clamping part 231. The number of the fourth guide holes is the same as that of the second guide rods. The fourth guide holes are arranged corresponding to the second guide rods. The axis direction of the fourth guide hole is the same as the extension direction of the second guide rod. One end of the second guide rod is fixedly connected to the second connecting part 232, and the other end of the second guide rod is inserted into the fourth guide hole and is movable in the fourth guide hole. The second guide rod is in match with the fourth guide hole to guide the movement of the second bottle body clamping part 231 relative to the second connecting part 232. The end of the second connecting part 232 near the second bottle body clamping part 231 is provided with fourth threaded holes. The number of the fourth threaded holes is the same as the number of the fourth guide holes. The fourth threaded holes are opposite to the fourth guide holes. The fourth guide hole is a blind hole arranged in a step-like manner. The fourth guide hole includes a third through hole and a fourth through hole which are in communication with each other. The third through hole is arranged near the second connecting part 232. The diameter of the third through hole is smaller than the diameter of the fourth through hole. The second guide rod is cylindrical, and the second guide rod includes a second clamping part and a second main body section that are sequentially connected. The diameter of the second clamping part is greater than the diameter of the second main body section. The second clamping part is movably arranged in the fourth threaded hole. The end of the second main body section far away from the second clamping part passes through the fourth threaded hole and the third threaded hole in sequence and is threaded to the fourth threaded hole. After the second bottle body clamping part 231 presses against the bottle body, the second bottle body clamping part 231 moves in the direction close to the second connecting part 232 under the action of the first spring. The fourth through hole provides an avoidance space for the movement of the second bottle body clamping part 231. By this configuration, the situation where the end of the second guide rod protrudes from the second bottle body clamping part 231 during the movement of the second bottle body clamping part 231 can be avoided, thereby avoiding interference when the second guide rod clamps the bottle body and ensuring smoothness of clamping the bottle body.

An embodiment of the present disclosure provides an experimental apparatus which may at least include an experimental platform and any one of the bottle cap opening and closing devices described in the above embodiments. Specifically, the bottle cap opening and closing device is arranged on the experimental platform.

Various embodiments of the present disclosure have been described above. The above description is exemplary but not exhaustive, and the present disclosure is not limited to the disclosed embodiments. Without deviating from the scope and spirit of the various embodiments illustrated, many modifications and changes are obvious to a person skilled in the art. The selection of terms used in this text aims to best explain the principles, the practical applications of various embodiments, or the improvements to the technologies on the market, or to enable other ordinary technical persons in the art to understand the disclosed embodiments.

What is claimed is:

1. A bottle cap opening and closing device, comprising:
- a base;
- a bottle body clamping mechanism which is rotatably arranged on the base and is used for clamping a bottle body;
- a first buffer mechanism which is arranged between the bottle body clamping mechanism and the base, and the first buffer mechanism enables the bottle body clamping mechanism to move relative to the base;
- a bottle cap clamping mechanism which is arranged opposite the bottle body clamping mechanism and is used for clamping a bottle cap; and
- a rotation driving mechanism which is in driving connection with the bottle body clamping mechanism and drives the bottle body clamping mechanism to rotate relative to the bottle cap clamping mechanism so as to enable the bottle body and the bottle cap to be relatively tightened or separated from each other.

2. The bottle cap opening and closing device according to claim 1, wherein the bottle body clamping mechanism comprises:
- a support seat;
- a drive mechanism which is arranged on the support seat; and
- a first clamping assembly and a second clamping assembly which are arranged opposite each other on the support seat, the drive mechanism being in driving connection with the first clamping assembly and/or the second clamping assembly and driving the first clamping assembly and/or the second clamping assembly to move, the first clamping assembly and the second clamping assembly being in cooperation with each other to clamp the bottle body;
- wherein the first clamping assembly and/or the second clamping assembly are provided with a second buffer mechanism.

3. The bottle cap opening and closing device according to claim 2, wherein the second buffer mechanism comprises a first buffer component, and the first clamping assembly comprises:
- a first connecting part which is arranged on the support seat; and a first bottle body clamping part which is arranged at one side of the first connecting part near the second clamping assembly, the first buffer component being arranged between the first connecting part and the first bottle body clamping part, and the first bottle body clamping part being movable relative to the first connecting part through the first buffer component.

4. The bottle cap opening and closing device according to claim 3, wherein the first buffer component comprises a first elastic member, one end of the first elastic member being connected to the first connecting part, and the other end of the first elastic member being connected to the first bottle body clamping part;

wherein the first elastic member is a first spring;

wherein the first buffer component further comprises a first guide rod, the first guide rod being arranged between the first connecting part and the first bottle body clamping part and being used for guiding the movement of the first bottle body clamping part relative to the first connecting part;

wherein the first spring is wound around the first guide rod.

5. The bottle cap opening and closing device according to claim 3, wherein the second clamping assembly comprises a second bottle body clamping part, and the second bottle body clamping part being arranged opposite to the first bottle body clamping part and being in cooperation with the first bottle body clamping part to clamp the bottle body;

wherein the second clamping assembly further comprises a second connecting part, and the second connecting part is connected with the second bottle body clamping part and is arranged at one side of the second bottle body clamping part far from the first bottle body clamping part.

6. The bottle cap opening and closing device according to claim 5, wherein the second buffer mechanism further comprises a second buffer component, the second buffer component is arranged between the second bottle body clamping part and the second connecting part, one end of the second buffer component is connected to the second bottle body clamping part, the other end of the second buffer component is connected to the second connecting part, and the second bottle body clamping part is movable relative to the second connecting part through the second buffer component.

7. The bottle cap opening and closing device according to claim 5, wherein:

one end of the first bottle body clamping part near the second bottle body clamping part has a first bottle body clamping surface, and a contact region between the first bottle body clamping surface and the bottle body is at a cambered surface or a planar surface of the first bottle body clamping surface, or there are a plurality of contact regions between the first bottle body clamping surface and the bottle body and an angle is formed between the plurality of contact regions of the first bottle body clamping surface;

one end of the second bottle body clamping part near the first bottle body clamping part has a second bottle body clamping surface, and the second bottle body clamping surface and the first bottle body clamping surface have a same structure or have a mirror symmetrical structure.

8. The bottle cap opening and closing device according to claim 7, wherein:

the first bottle body clamping surface and the second bottle body clamping surface are both provided with a first elastic structure; and the first bottle body clamping surface and the second bottle body clamping surface are both provided with a first anti-slip structure;

wherein the first anti-slip structure is a first anti-slip pattern or a first anti-slip particle, and the first anti-slip structure is provided on the first elastic structure.

9. The bottle cap opening and closing device according to claim 5, wherein:

the driving mechanism comprises a first driving assembly, the first driving assembly is connected to the first clamping assembly to move the first clamping assembly in a direction facing to or opposite the second clamping assembly;

the driving mechanism further comprises a second driving assembly, and the second driving assembly is in driving connection with the second clamping assembly to move the second clamping assembly in a direction facing to or opposite the first clamping assembly.

10. The bottle cap opening and closing device according to claim 2, wherein the bottle body clamping mechanism further comprises:

a sensor which is arranged on the support seat and is used for detecting whether there is a bottle body between the first clamping assembly and the second clamping assembly.

11. The bottle cap opening and closing device according to claim 1, wherein the bottle cap clamping mechanism comprises:

a body;

a driving member which is arranged on the body; and a first gripper assembly, the driving member being in driving connection with the first gripper assembly to drive the first gripper assembly to clamp the bottle cap.

12. The bottle cap opening and closing device according to claim 11, wherein the first gripper assembly comprises a plurality of clamping parts, each of the clamping parts has a clamping surface, and the plurality of clamping parts are in cooperation with each other through a plurality of said clamping surfaces to clamp the bottle cap, or the first clamping assembly comprises a plurality of clamping rods which are in cooperation with each other to clamp the bottle cap.

13. The bottle cap opening and closing device according to claim 11, wherein the bottle cap clamping mechanism further comprises:

a second gripper assembly, the second gripper assembly and the first gripper assembly being arranged independently, and the driving member being further drive-connected to the second gripper assembly so as to drive the first gripper assembly and the second gripper assembly to clamp the bottle cap separately;

wherein the first gripper assembly and the second gripper assembly have different structures, the first gripper assembly and the second gripper assembly are arranged at both sides of the body respectively, and a position of the first gripper assembly and/or a position of the second gripper assembly relative to the body is adjustable.

14. The bottle cap opening and closing device according to claim 13, wherein the second gripper assembly comprises a plurality of clamping rods which are in cooperation with each other to clamp the bottle cap;

wherein the clamping rod comprises a first clamping segment, the first clamping segment has a second bottle cap clamping surface being used for clamping the bottle cap, and the second bottle cap clamping surface of at least one of the clamping rods is a planar surface or a cambered surface;

wherein a third anti-slip structure is provided on the clamping surface of the second bottle cap;

wherein the clamping rod further comprises a second clamping segment which is connected to the first clamping segment and located above the first clamping segment, and a third elastic structure is provided on the second clamping segment.

15. The bottle cap opening and closing device according to claim 14, wherein the second gripper assembly further comprises a plurality of main body parts, each of the main body parts is connected to at least one of the clamping rods, and the clamping rod is below the main body part;

wherein the driving member is drive-connected to the main body part, and the driving member drives the clamping rod to move through the main body part;

wherein the bottle cap clamping mechanism further comprises a plurality of third connecting parts, each of the third connecting parts is connected to at least one of the main body parts;

wherein the driving member is drive-connected to the third connecting part, and the driving member drives the main body part to move through the third connecting part;

wherein the third connecting part comprises a first connecting segment and a second connecting segment connected at an included angle, the driving member is connected to the first connecting segment of the third connecting part, and the second connecting segment of the third connecting part is connected to the main body part.

16. The bottle cap opening and closing device according to claim 15, wherein one end of the first connecting segment of the third connecting part far from the second connecting segment of the third connecting part is above the second connecting segment of the third connecting part, and the second connecting segment of the third connecting part is connected with the main body portion at an included angle;

wherein an L-shaped structure is formed after the first connecting segment of the third connecting part is in connection with the second connecting segment of the third connecting part, an L-shaped structure is formed after the second connecting segment of the third connecting part is in connection with the main body part, and an L-shaped structure is formed after the main body portion is in connection with the clamping rod.

17. The bottle cap opening and closing device according to claim 15, wherein the number of the third connecting parts is two, the two third connecting parts are arranged opposite each other, and the main body part is between the two third connecting parts;

wherein:

the number of the main body parts is two, the two main body parts are arranged opposite each other, and the main body parts are connected to the third connecting part in a one-to-one correspondence manner;

wherein the number of the clamping rods is four, one of the main body parts is correspondingly connected to two of the clamping rods, and the clamping rods on the two main body parts are arranged opposite each other; wherein the first gripper assembly comprises two first bottle cap clamping parts arranged opposite each other, the first bottle cap clamping parts are connected to the third connecting parts in a one-to-one correspondence manner, and the first bottle cap clamping part is between the two third connecting parts.

18. The bottle cap opening and closing device according to claim 15, wherein the bottle cap clamping mechanism further comprises a displacement mechanism arranged on the body, and the displacement mechanism is drive-connected to the second gripper assembly to adjust a position of the second gripper assembly relative to the body;

wherein the displacement mechanism comprises a lifting structure which comprises:

another driving member arranged on the body; and a first lifting plate, the another driving member being drive-connected to the first lifting plate, the first lifting plate being provided with a first limit part, the main body part being slidably connected to the first limit part, and the another driving member driving the second gripper assembly to rise or descend through the first lifting plate;

wherein the lifting structure further comprises:

a plurality of third guide rods, each of the connecting parts being provided with at least one of the third guide rods, the third guide rods being slidably connected to the main body parts in a one-to-one correspondence manner, the first lifting plate driving the main body part to rise and descend along the third guide rod, and the third connecting part driving the second gripper assembly to clamp the bottle cap through the third guide rod and the first limit part.

19. The bottle cap opening and closing device according to claim 13, wherein the bottle cap clamping mechanism further comprises a displacement mechanism arranged on the body, and the displacement mechanism is drive-connected to the first gripper assembly and/or the second gripper assembly to adjust a position of the first gripper assembly and/or a position of the second gripper assembly relative to the body.

20. The bottle cap opening and closing device according to claim 11, wherein the first gripper assembly comprises a plurality of first bottle cap clamping parts, each of the first bottle cap clamping parts has a first bottle cap clamping surface, and the plurality of first bottle cap clamping parts are in cooperation with each other through a plurality of said first bottle cap clamping surfaces to clamp the bottle cap;

wherein a contact region between the first bottle cap clamping surface of the first bottle cap clamping part and the bottle cap is at a cambered surface or a planar surface of the first bottle cap clamping surface; or, there are a plurality of contact regions between the first bottle cap clamping surface of the first bottle cap clamping part and the bottle cap, and an angle is formed between the plurality of contact regions of the first bottle cap clamping surface;

wherein the first gripper assembly further comprises:

a second anti-slip structure on the first bottle cap clamping surface; and/or, a second elastic structure on the first bottle cap clamping surface.

21. The bottle cap opening and closing device according to claim 11, wherein the bottle cap clamping mechanism further comprises:

a quick-change connecting plate and a pneumatic quick-change connector, the quick-change connecting plate being arranged on the body, and the pneumatic quick-change connector being arranged on the quick-change connecting plate.

22. The bottle cap opening and closing device according to claim 1, wherein the first buffer mechanism comprises:

a lifting plate, a height of which being adjustable relative to the base, and the bottle body clamping mechanism being arranged on the lifting plate; and a buffer component which is arranged between the base and the lifting plate, and the lifting plate being able to rise or descend relative to the base through the buffer component;

wherein the rotation driving mechanism comprises:

a rotation driving member arranged on the lifting plate;

a rotary shaft being rotatably arranged on the lifting plate, an axis of the rotary shaft extending vertically, the rotation driving member being in driving connection with one end of the rotary shaft, the other end of the rotary shaft being connected to the bottle body clamping mechanism, and the rotation driving member driving the rotary shaft to rotate so as to drive the bottle body clamping mechanism to rotate.

23. The bottle cap opening and closing device according to claim 22, wherein the rotation driving member is a rotary motor which has an output shaft, an axis of the output shaft extends vertically, and the rotation driving mechanism further comprises:

a first synchronous wheel which is fixedly connected to the rotary shaft and is coaxially arranged with the rotary shaft;

a second synchronous wheel which is fixedly connected to the output shaft and is coaxially arranged with the output shaft; and a synchronous belt arranged on outer circumferences of the first synchronous wheel and the second synchronous wheel, and the rotary motor driving the first synchronous wheel to rotate through the cooperation of the second synchronous wheel and the synchronous belt.

24. The bottle cap opening and closing device according to claim 22, wherein the buffer component comprises a third elastic member, one end of the third elastic member is connected to the lifting plate, and the other end of the third elastic member is connected to the base;

wherein the third elastic member is a third spring;

wherein the buffer component further comprises a fourth guide rod, the fourth guide rod is arranged between the lifting plate and the base and is used for guiding the lifting plate to rise or descend relative to the base;

wherein the third spring is wound around the fourth guide rod.

25. The bottle cap opening and closing device according to claim 22, further comprising a guide part which is arranged between the base and the lifting plate, the lifting plate being slidably connected to the guide part, and the lifting plate sliding on the guide part through the buffer component;

wherein the lifting plate comprises:

a support plate, the bottle body clamping mechanism being rotatably arranged on the support plate; and a sliding plate, one end of the sliding plate being connected to the support plate, the other end of the sliding plate being located below the support plate, an included angle being formed between the sliding plate and the support plate, the sliding plate being slidably connected to the guide part, and the buffer component being arranged at one end of the sliding plate away from the support plate.

26. The bottle cap opening and closing device according to claim 1, further comprising a moving mechanism, the bottle cap clamping mechanism being arranged on the moving mechanism, and the moving mechanism driving the bottle cap clamping mechanism to move;

wherein the moving mechanism comprises a robotic arm.

27. An experimental apparatus, comprising an experimental platform and a bottle cap opening and closing device, wherein the bottle cap opening and closing device is arranged on the experimental platform and comprises:

a base;

a bottle body clamping mechanism which is rotatably arranged on the base and is used for clamping a bottle body;

a first buffer mechanism which is arranged between the bottle body clamping mechanism and the base, and the first buffer mechanism enables the bottle body clamping mechanism to move relative to the base;

a bottle cap clamping mechanism which is arranged opposite the bottle body clamping mechanism and is used for clamping a bottle cap; and a rotation driving mechanism which is in driving connection with the bottle body clamping mechanism and drives the bottle body clamping mechanism to rotate relative to the bottle cap clamping mechanism so as to enable the bottle body and the bottle cap to be relatively tightened or separated from each other.

* * * * *